(12) United States Patent
Shearer

(10) Patent No.: US 8,234,234 B2
(45) Date of Patent: Jul. 31, 2012

(54) UTILIZING RAY TRACING FOR ENHANCED ARTIFICIAL INTELLIGENCE PATH-FINDING

(75) Inventor: Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 11/688,390

(22) Filed: Mar. 20, 2007

(65) Prior Publication Data

US 2008/0231628 A1 Sep. 25, 2008

(51) Int. Cl.
G06F 9/44 (2006.01)
G06N 7/02 (2006.01)
G06N 7/06 (2006.01)

(52) U.S. Cl. .......................................... 706/52

(58) Field of Classification Search ...................... 706/52
See application file for complete search history.

(56) References Cited

U.S. PATENT DOCUMENTS

2006/0091297 A1 * 5/2006 Anderson et al. ............. 250/221

OTHER PUBLICATIONS

Tomlinson, Simon. "The Long and Short of Steering in Computer Games" I.J. of Simulation vol. 1-2 No. 5. 2003.*
Woop, Sven. Gerd Marmitt, and Philipp Slusallek "B-KD Trees for Hardware Accelerated Ray Tracing of Dynamic Scenes" Graphics Hardware the Eurographics Association 2006.*
Gamespot-1 "WraitH" verified by wayback machine to 1999.*
Gamespot-2 "Siege Tank" Verified by wayback machine to 1999.*
Shim, David, Hoam Chung, Jin Kim, and Shankar Sastry. "Autonomous Exploration in Unknown Urban Environments for Unmanned Aerial Vehicles" 2005 AIAA GN&C Conference p. 1-8. Downloaded Apr. 12, 2010.*
Stout, Bryan. "Smart Moves: Intelligent Pathfinding." Pulished in Game Developoer Magazine, Jul. 1997. p. 10. Downlaoded Apr. 12, 2010.*
Rost, Stanislay. "Evolution of Formidable Player AI in Tactical 3D games" MIT Laborator for Computer Science. 2004 [ONLINE] DOwnloaded Aug. 30, 2011 http://www.rostochki.com/static/files/cs-ai.pdf.*

* cited by examiner

*Primary Examiner* — Kakali Chaki
*Assistant Examiner* — Ben Rifkin
(74) *Attorney, Agent, or Firm* — Patterson & Sheridan, LLP

(57) ABSTRACT

Embodiments of the invention provide methods and apparatus to use ray-tracing to perform artificial intelligence path-finding. Embodiments of the invention may cast a ray into a three-dimensional scene to determine a path from a starting point to an ending point. The ray may have a trajectory which originates at the starting point and proceeds towards the ending point. The artificial intelligence system may perform ray-tracing using a spatial index to determine if the ray intersects any objects within the three-dimensional scene. If the ray reaches the ending point without intersecting any objects, the path of the ray from the starting point to the ending point is the determined path. However, if the ray intersects an object, the artificial intelligence system may cast additional rays into the three-dimensional scene and perform ray tracing with the additional rays to determine a path from the start point to the end point.

22 Claims, 26 Drawing Sheets

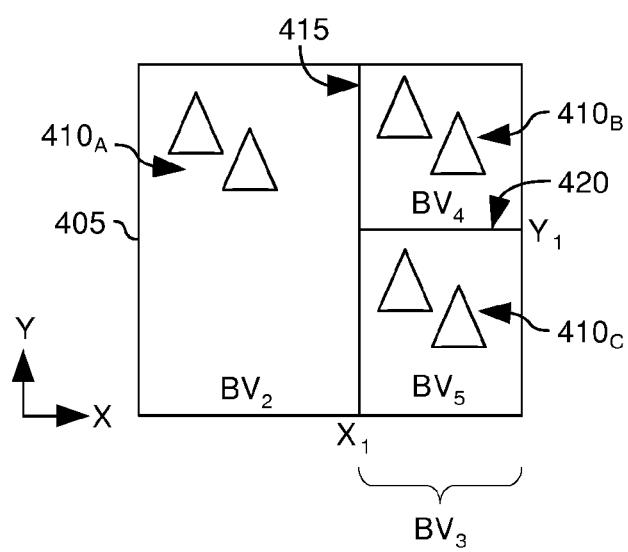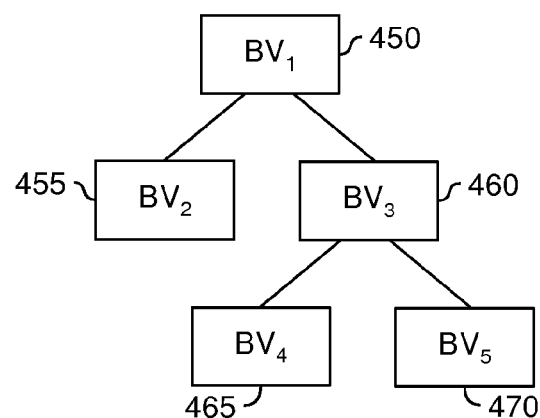
FIG. 4C

FIG. 8 (FRAME N)

FIG. 9 (FRAME N)

FIG. 10 (FRAME N+1)

FIG. 11 (FRAME N+1)

UTILIZING RAY TRACING FOR ENHANCED ARTIFICIAL INTELLIGENCE PATH-FINDING

BACKGROUND OF THE INVENTION

1. Field of the Invention

Embodiments of the invention generally relate to the field of computer processing.

2. Description of the Related Art

Artificial intelligence systems commonly perform tasks to simulate human decision making processes. One common task performed by artificial intelligence is determining a path between a starting point and an ending point (final destination). This is often referred to as path finding.

One example of an artificial-intelligence path finding algorithm is the "a-star" algorithm. The a-star algorithm determines a path to take between a starting point and an ending point by first creating a two-dimensional grid of a scene which contains the starting point, the ending point, and other objects located within the scene. Next, the a-star algorithm calculates cost factors associated with different blocks created by the grid. The cost factors may take into consideration the proximity of the blocks from the starting point and the proximity of the block form the destination or ending point. After the cost factors for blocks are calculated, the a-star algorithm selects blocks which have lower cost factors to determine a path to take from the starting point to the destination point.

Although the a-star algorithm may calculate a possible path to take from the starting point to the destination point, the a-star algorithm may require a signification number of calculations to create the grid and to calculate cost factors associated with the different blocks formed by the grid. Therefore, there exists a need for more efficient techniques and devices to perform artificial intelligence path-finding.

SUMMARY OF THE INVENTION

Embodiments of the present invention generally provide methods and apparatus for artificial intelligence path-finding.

According to one embodiment of the invention, a method of artificial intelligence path finding is provided. The method generally comprising: issuing an initial ray into a three-dimensional scene, wherein the initial ray originates at a starting point and has a trajectory directed towards an ending point; determining if the initial ray intersects an object between the starting point and the ending point in the three-dimensional scene by performing ray tracing; and if the initial ray does not intersect any objects within the three-dimensional scene, setting a path of the initial ray as a path from the starting point to the ending point.

According to another embodiment of the invention, a computer readable medium containing a program is provided. The program, when executed, performs operations generally comprising: issuing an initial ray into a three-dimensional scene, wherein the initial ray originates at a starting point and has a trajectory directed towards an ending point; determining if the initial ray intersects an object between the starting point and the ending point in the three-dimensional scene by performing ray tracing; and if the initial ray does not intersect any objects within the three-dimensional scene, setting a path of the initial ray as a path from the starting point to the ending point.

According to another embodiment of the invention, an artificial intelligence system is provided. The artificial intelligence system generally comprising: a memory device containing a spatial index having nodes which correspond to bounding volumes which partition a three-dimensional scene; and a processing element configured to determine a path from a starting point to an ending point by issuing an initial ray into a three-dimensional scene, wherein the initial ray originates at the starting point and has a trajectory directed towards the ending point; determining if the initial ray intersects an object between the starting point and the ending point in the three-dimensional scene by performing ray tracing; and if the initial ray does not intersect any objects within the three-dimensional scene, setting a path of the initial ray as the path from the starting point to the ending point.

According to another embodiment of the invention another method of artificial intelligence path finding is provided. The method generally comprising: generating a path box within a three-dimensional scene, wherein the path box encompasses at least a portion of a character and a path to be traversed by the character within the three-dimensional scene; tracing the path box through a spatial index having nodes defining bounding volumes which partition the three-dimensional scene to determine if the path box intersects objects within the three-dimensional scene; and based on the results of tracing the path box through the spatial index, determining a path for the character to traverse from a starting point within the three-dimensional scene to an ending point within the three-dimensional scene.

BRIEF DESCRIPTION OF THE DRAWINGS

FIGS. 4A-4C illustrate a two-dimensional space to be rendered by an image processing system and a corresponding spatial index created by an image processing system, according to embodiments of the invention.

DETAILED DESCRIPTION OF THE PREFERRED EMBODIMENTS

Figure 1:
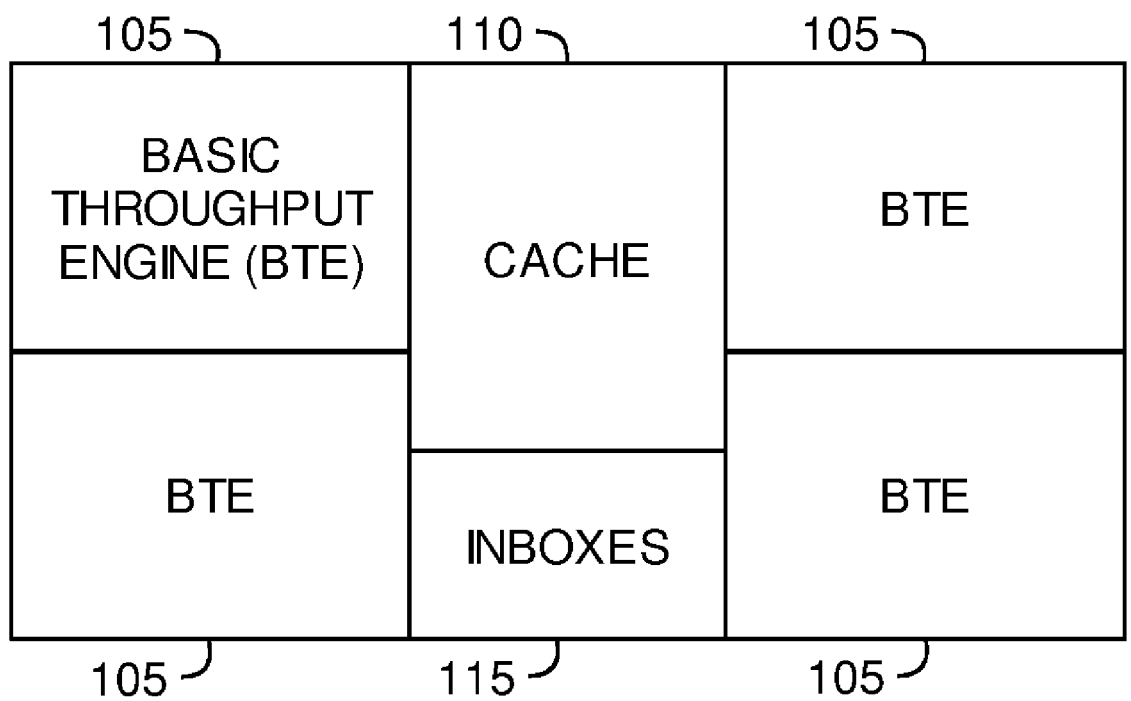
FIGS. 1, 5 and 17 illustrate multiple core processing elements, according to embodiments of the invention.

Embodiments of the invention provide methods and apparatus to perform artificial intelligence path finding using ray-tracing. According to embodiments of the invention, an artificial intelligence system (hereinafter AIS) may cast a ray into a three-dimensional scene to determine a path from a start point to an end point. The ray may have a trajectory which originates at the start point and proceeds towards the end point. The AIS may perform ray-tracing using a spatial index to determine if the ray intersects any objects within the three-dimensional scene. If the ray reaches the end point without intersecting any objects, the path of the ray from the start point to the end point is the determined path. However, if the ray intersects an object, the AIS may cast more rays into the three-dimensional scene from the start point with different trajectories to determine a path from the start point to the end point.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
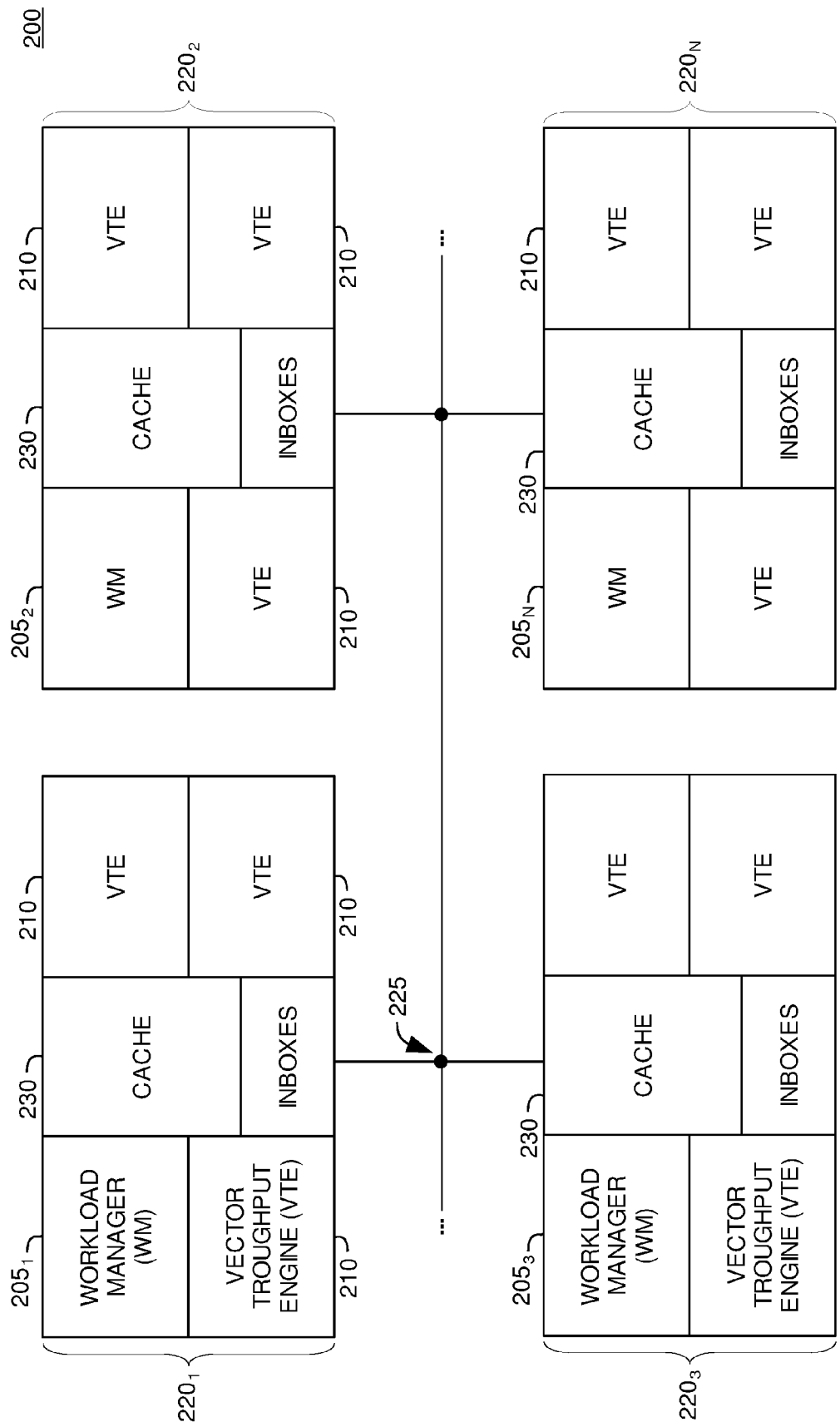
FIG. 2 illustrates multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$ according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$ according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$ and/or distribute tasks to other vector throughput engines 210. The use of a high speed bus 225 may allow the workload managers $205_{1-N}$ to communicate without affecting the caches 230 with data packets related to workload manager communications.

An Exemplary Three-Dimensional Scene

Figure 3:
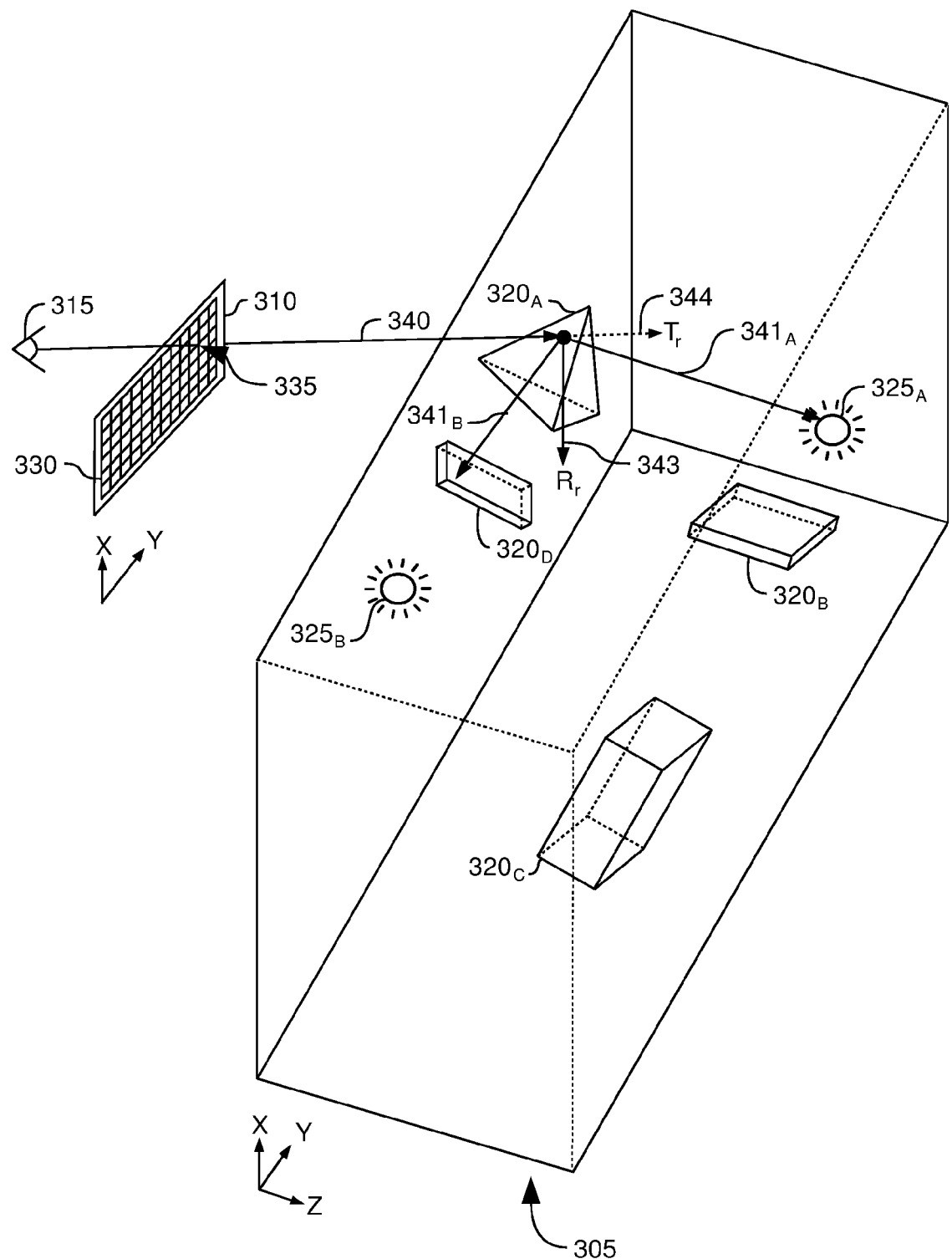
FIG. 3 is an exemplary three-dimensional scene to be rendered by an image processing system, according to one embodiment of the invention.

FIG. 3 is an exemplary three-dimensional scene 305 to be rendered by an image processing system. Within the three-dimensional scene 305 may be objects 320. The objects 320 in FIG. 3 are of different geometric shapes. Although only four objects 320 are illustrated in FIG. 3, the number of objects in a typical three-dimensional scene may be more or less. Commonly, three-dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three-dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 305 into a two-dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two-dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three-dimensional scene 305 the ray 340 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted or a refracted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted or refracted ray. A refracted ray may be issued by the image processing system if the object with which the original ray intersected has transparent or translucent properties (e.g., glass). A refracted ray traverses through the object at an angle relative to the angle at which the original ray struck the object. For example, refracted ray 344 is seen traversing through the object $320_A$ which the original ray 340 intersected.

Another type of secondary ray is a transmitted or a refracted ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
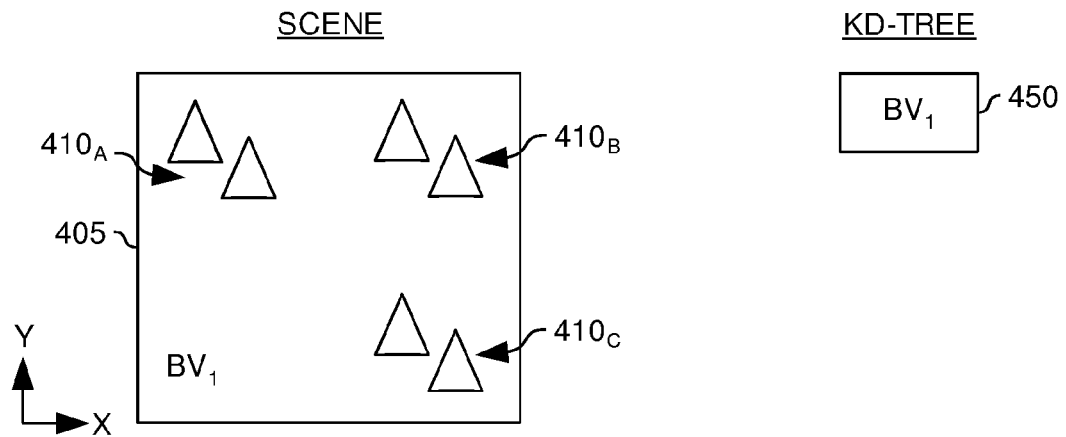
Figure 4B:
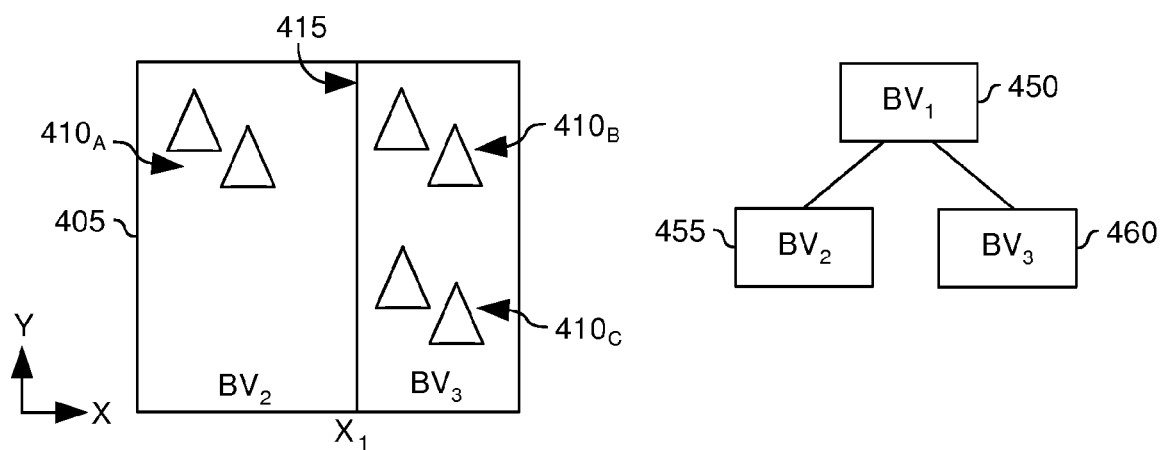

FIGS. 4A-4C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 4A-4C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 4A illustrates a two-dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two-dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane SP$_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two-dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives 410B, and leaf node $BV_5$ may contain pointers to primitives 410c.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Physics Engine

A physics engine is an application which may simulate real world physical phenomena as applied to objects within a three-dimensional scene. A physics engine may be used to simulate and predict the effects of physical phenomena on a frame to frame basis. For example, the physics engine may perform position updates for an object if the object is moving, and may perform collision detection tests to determine if an object collides with any other objects within the three-dimensional scene.

An image processing system may be used in conjunction with a physics engine to render the simulated physical interactions and objects within a three-dimensional scene to a two-dimensional screen. For example, a video game engine may use both a physics engine and an image processing system to simulate object movements or interactions within a three-dimensional scene and to display the objects and the environment on a monitor.

Figure 5:
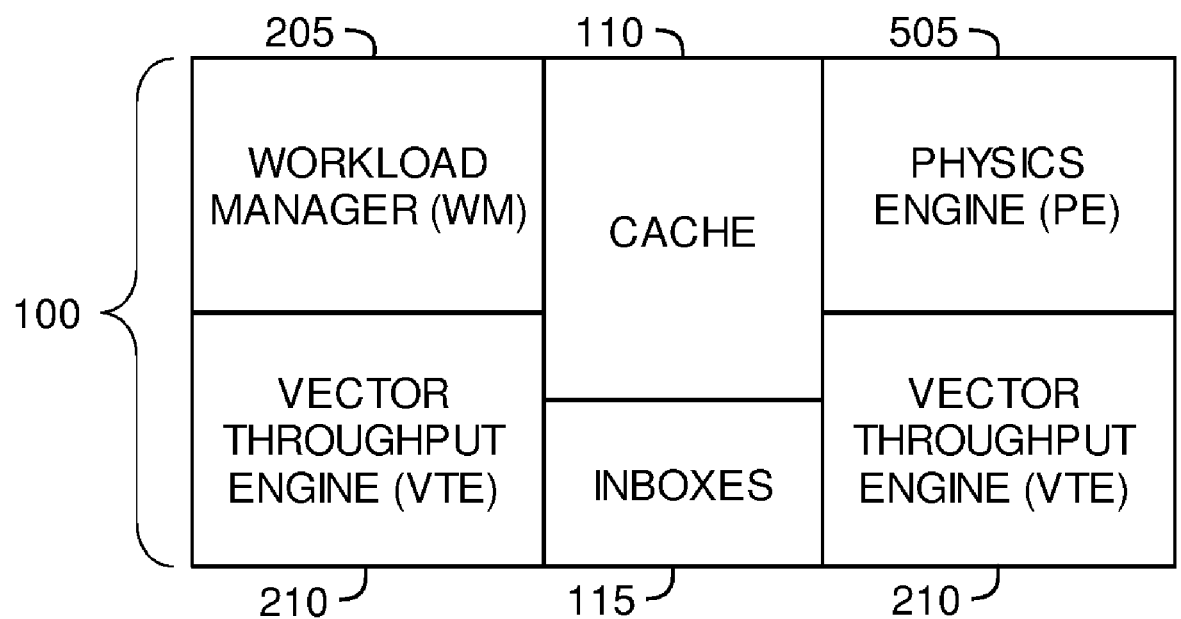

According to one embodiment of the invention, a physics engine may use multiple threads on a multiple core processing element to perform physics related calculations. For example, FIG. 5 illustrates a multiple core processing element 100 wherein the threads of one of the cores are allocated to a physics engine 505. Other cores within the multiple-core processing element may perform image processing related tasks, according to embodiments of the invention. For example, one core within the multiple-core processing element 100 may be allocated to a workload manager 205 and other cores within the multiple-core processing element 100 may be allocated to vector throughput engines 210, according to one embodiment of the invention.

The multiple-core processing element 100 may have a memory cache 110 shared between all of the cores located on the multiple-core processing element 100. Furthermore, each core may have its own cache (e.g., an L1 cache). The multiple-core processing element 100 may also contain inboxes 115. The inboxes 115 may be memory mapped address space used by the cores as a communications network.

Figure 6:
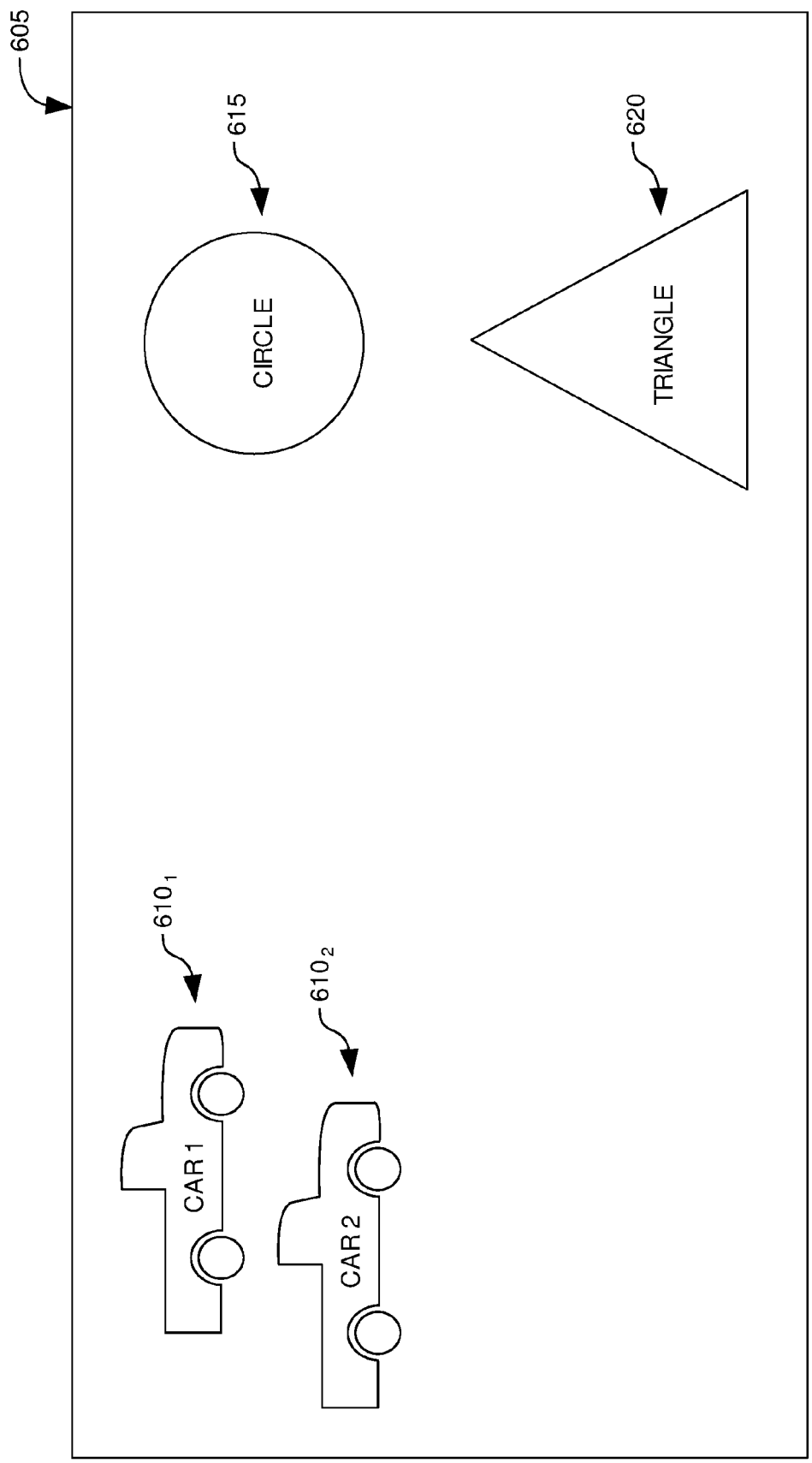
FIG. 6 illustrates an exemplary three-dimensional scene to be rendered by an image processing system, according to embodiments of the invention.

FIG. 6 illustrates an exemplary three-dimensional scene 605. The three-dimensional scene 605 contains several objects including a first car object $610_1$, a second car object $610_2$, a circle object 615, and a triangle object 620. A physics engine may simulate real world physical phenomena as applied to the objects (i.e., $610_1$, $610_2$, 615, and 620) within the three-dimensional scene 605 illustrated in FIG. 6.

One structure a physics engine may use to keep track of objects in a three-dimensional scene is a scene graph or a scene index. On a frame to frame basis, the physics engine 505 may use a scene graph to store and access information which defines the objects located within the three-dimensional scene. The scene graph may use a hierarchical structure (e.g., a tree) to index or order the objects.

Figure 7:
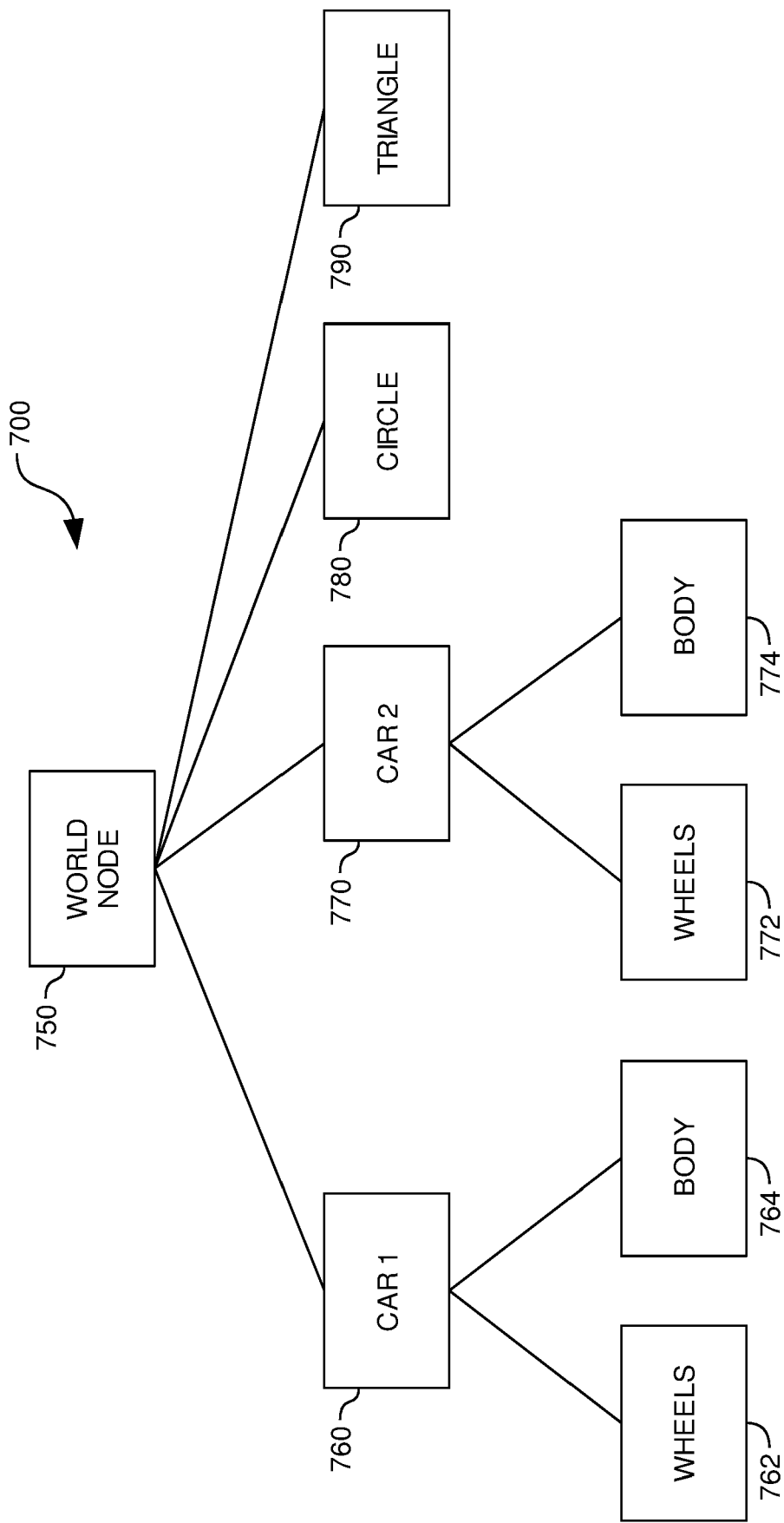
FIG. 7 illustrates a scene graph, according to one embodiment of the invention.

For example, FIG. 7 illustrates an exemplary scene graph 700, according to one embodiment of the invention. As illustrated, the scene graph 700 may contain a world node 750 which represents the entire three-dimensional scene 605. The world node 750 may branch to nodes which represent objects within the three-dimensional scene. For example, the world node 750 may branch to four object nodes. Each of the four object nodes in the scene graph 700 may correspond to one of the four objects within the three-dimensional scene 605 of FIG. 6 (i.e., a node 760 corresponding to the first car object $610_1$, a node 770 corresponding to the second car object $610_2$, a node 780 corresponding to the circle object 615, and a node 790 corresponding to the triangle object 620).

The object nodes may branch to other nodes on a lower level of the scene graph 700. The branched to nodes may represent objects which make up part of the larger object or may be nodes which define the object (position, color, mass, etc.). For example, the node 760 representing the first car object branches to a node 762 representing a wheels object and to a node 764 representing a body object. Thus, the scene graph is a hierarchical acceleration data structure based on objects located within a three-dimensional scene.

The scene graph may be stored, for example, in a memory cache (e.g., cache 110) of a processing element to enable the physics engine 505 fast access to the information contained within the scene graph 700. Because a scene graph 700 is an object oriented structure and a physics engine performs calculations on an object by object basis, a scene graph is an efficient structure to use with a physics engine.

In contrast to a physics engine using a scene graph, an image processing system may use a spatial index (e.g., a kd-tree) to render a two-dimensional image from a three-dimensional scene. As described previously with respect to FIG. 4, a spatial index partitions a three-dimensional scene based on a spatial or bounding volume hierarchy. Because a scene graph is a spatial based structure and a ray tracing image processing system performs calculations based on where a ray traverses through a three-dimensional scene, a spatial index is an efficient structure to use with a ray tracing image processing system.

Figure 8:
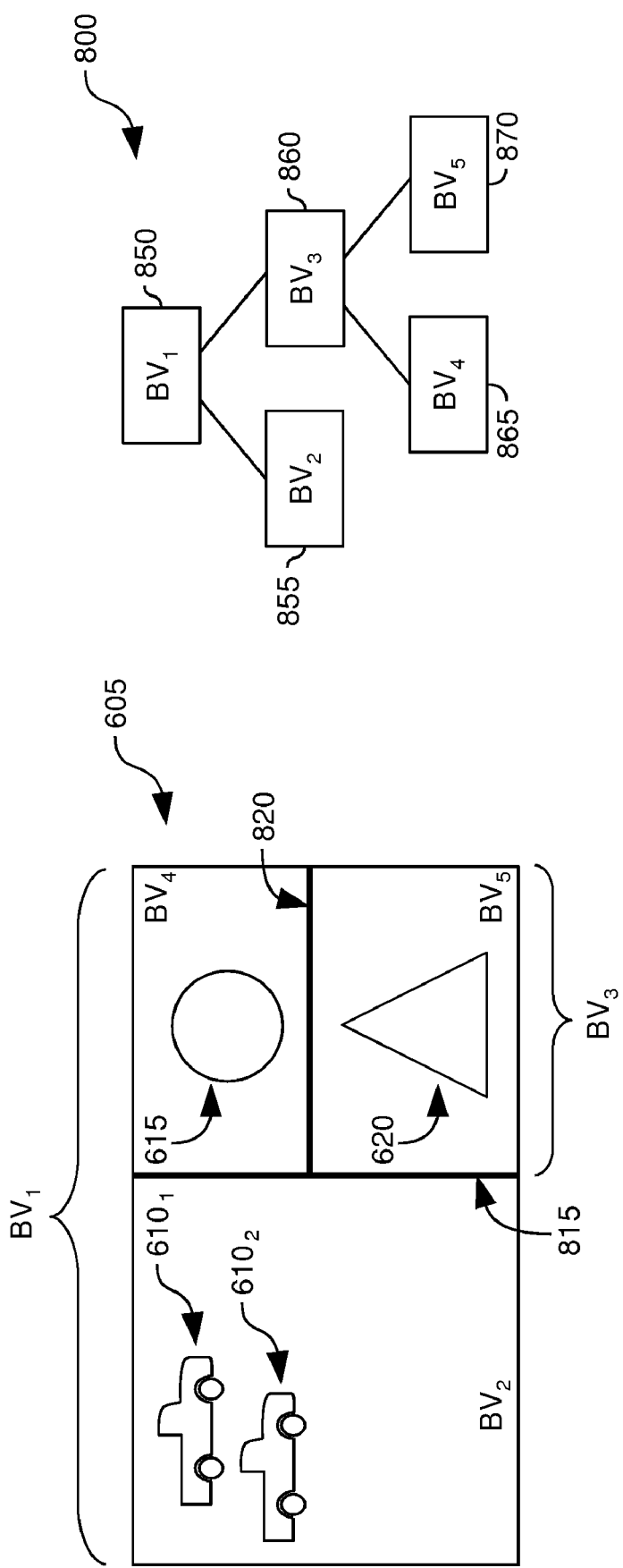
FIG. 8 illustrates a three-dimensional scene to be rendered by an image processing system and a corresponding spatial index, according to one embodiment of the invention.

FIG. 8 illustrates a spatial index 800 which may be used by an image processing system to render a two-dimensional image from the three-dimensional scene 605. The three-dimensional scene 605 illustrated in FIG. 7 may be the same three-dimensional scene 605 to which the scene graph 700 corresponds.

The spatial index 800 may contain a world node 850 which defines bounding volume 1 ($BV_1$) which encompasses the entire volume of the three-dimensional scene 605. $BV_1$ may be partitioned into two smaller bounding volumes $BV_2$ and $BV_3$ through the use of a splitting plane 815. The partitioning of $BV_1$ is reflected in the kd-Tree as the two nodes 855 and 860, corresponding to $BV_2$ and $BV_3$ respectively, under the internal or parent node $BV_1$ 850. The internal node 850 representing $BV_1$ may now store information such as, but not limited to, pointers to the two nodes beneath $BV_1$ (e.g., $BV_2$ and $BV_3$), along which axis the splitting plane 815 was drawn (e.g., x-axis), and where along the axis the splitting plane 815 was drawn.

Furthermore, $BV_3$ may be partitioned into two smaller bounding volumes $BV_4$ and $BV_5$. Two leaf nodes 865 and 870 in the spatial index may correspond to the bounding volumes $BV_4$ and $BV_5$, respectively.

The leaf nodes (i.e., 855, 865, and 870) of the spatial index 800 may include information which defines the corresponding bounding volumes within the three-dimensional scene (i.e., $BV_2$, $BV_4$ and $BV_5$) and may contain pointers to primitives located within the corresponding bounding volumes.

On a frame to frame basis, objects within the three-dimensional scene may move or change shape. In response to changes in position or shape of objects, the spatial index may need to be updated such that the spatial index accurately reflects the location of objects or primitives within the three-dimensional scene. Similarly, a scene graph used by the physics engine 505 may also need to be updated to accurately reflect the new position or shape of objects within the three-dimensional scene. Thus, in response to objects moving or changing shape, two data structures may need to be updated on a frame to frame basis.

The image processing system may store the spatial index 800, for example, in the memory cache (e.g., cache 110). As previously described, a scene graph may also be stored in the memory cache 110 of the multiple core processing element 100. However, in some circumstances the memory cache 110 may not have enough storage space available to efficiently store both the scene graph 700 and the spatial index 800.

Integrated Acceleration Data Structure for Physics and Ray Tracing Image Processing According to embodiments of the invention, an integrated acceleration data structure may be used by both the physics engine 505 and the image processing system in order to perform both physics calculations and to perform ray tracing respectively. A single integrated acceleration data structure may perform the functions of a spatial index and may simultaneously perform the functions of a scene graph. By using a single integrated acceleration data structure rather than using two data structures, the amount of space required to store information sufficient for both the physics engine 505 and the image processing system to perform their respective tasks may be reduced. Furthermore, in contrast to the need to update two data structures in response to movements of objects within the three-dimensional scene, the image processing system may only need to update a single data structure (i.e., the integrated acceleration data structure). The processing time gained by only updating a single data structure may reduce the time necessary to perform physics engine tasks and image processing tasks, thus increasing overall system performance.

According to one embodiment of the invention, an integrated spatial index may be formed by initially partitioning a three-dimensional scene into bounding volumes that encompass objects within the three-dimensional scene. Accordingly, the initial or top portions of the integrated acceleration data structure are formed based on a spatial or bounding volume hierarchy. Once a bounding volume encompasses an object within the three-dimensional scene, an object oriented hierarchy may be used to represent the object within the bounding volume. Thus, the lower portions of the integrated acceleration data structure are formed based on an object oriented hierarchy. Consequently, the initial or top portions of the integrated acceleration data structure may resemble a spatial index 800 (e.g., a kd-tree) and the lower portions of the integrated acceleration data structure may resemble a scene graph 700.

Figure 9:
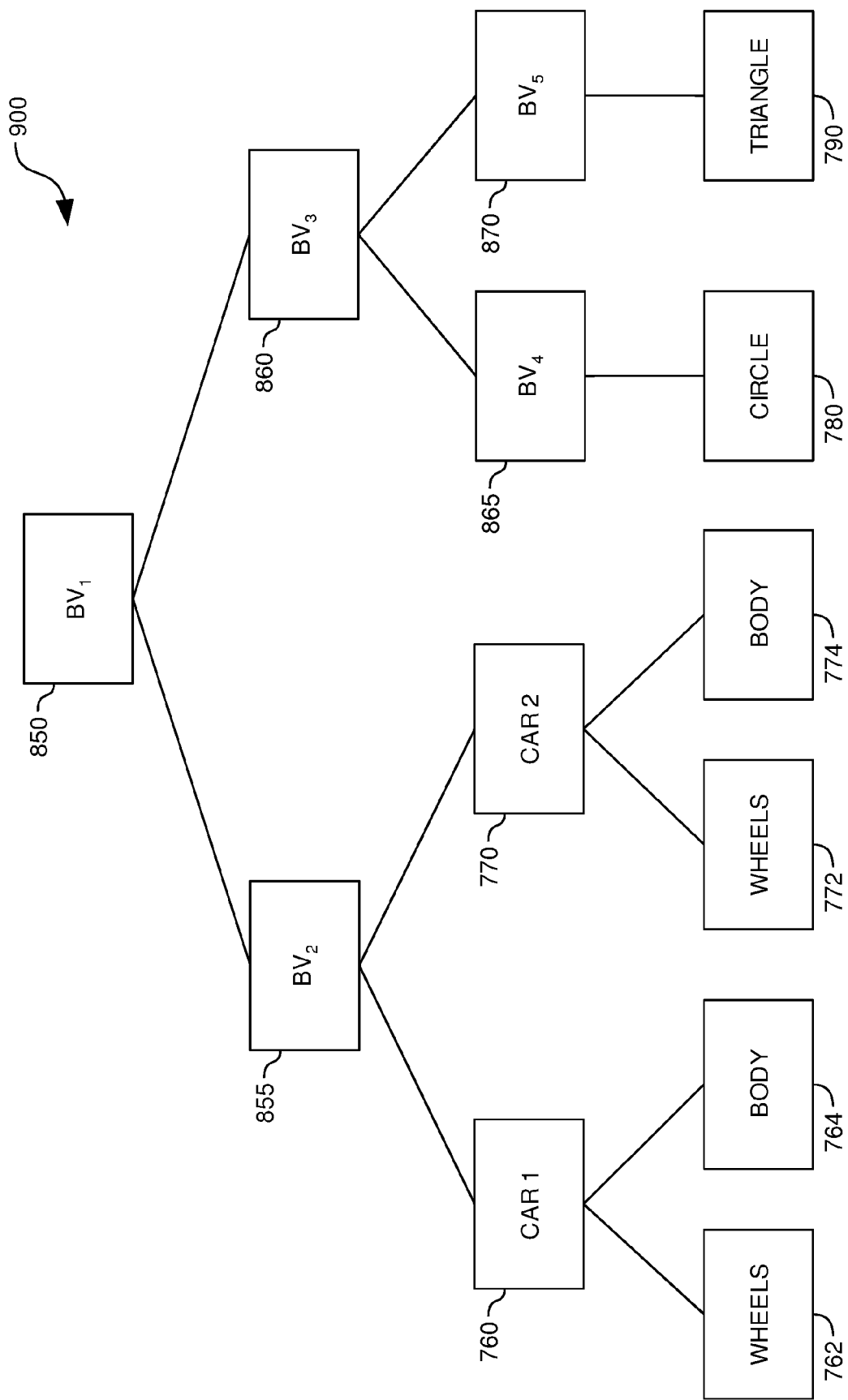
FIGS. 9, 11 and 15 illustrate integrated acceleration data structures, according to embodiments of the invention.

FIG. 9 illustrates an integrated acceleration data structure 900, according to one embodiment of the invention. The exemplary integrated acceleration data structure 900 corresponds to the three-dimensional scene 605 illustrated in FIG. 6.

The integrated acceleration data structure 900 illustrated in FIG. 9 has an initial structure defined by the spatial index 800 which was described with reference to FIG. 8, having a world node and smaller bounding volumes.

According to embodiments of the invention, in order to form an integrated acceleration data structure 900, the nodes which define bounding volumes within the three-dimensional scene may branch to (i.e., contain information which points to) nodes which define objects located within bounding volumes. Thus, in contrast to a spatial index where the final spatially oriented nodes (i.e., the leaf nodes) only point to primitives, the final spatially oriented nodes in an integrated acceleration data structure 900 may branch to object nodes which define objects.

For example, as illustrated in FIG. 9, node 855 corresponding to $BV_2$ may branch to object nodes 760 and 770 (representing the first car object $610_1$ and the second car object $610_2$) from the scene graph 700. The object nodes 760 and 770 are branched to from the node 855 corresponding to $BV_2$ because the first car object $610_1$ and the second car object $610_2$ are both located within bounding volume $BV_2$ as illustrated in FIG. 8.

Similar to the scene graph 700, the nodes branched to from each object node in the integrated acceleration data structure 900 may continue to define properties of the objects or portions of the object which collectively construct the object. For example, each car object node branches to a wheel object node (e.g., 762 or 772) and a body object node (e.g., 764 or 774), which further define each car object.

Also illustrated in the integrated acceleration data structure 900 are nodes corresponding to the remaining objects in the three-dimensional scene 605. For example, the circle object node 780 is branched to from the node 865 defining the bounding volume $BV_4$. The circle object node 780 may be branched to from the node 865 defining bounding volume $BV_4$, because the circle object 615 is located within bounding volume $BV_4$. Furthermore, the triangle object node 790 is branched to from the node 870 defining the bounding volume $BV_5$. The triangle object node 790 may be branched to from the node 865 defining bounding volume $BV_5$, because the triangle object 620 is located within bounding volume $BV_5$.

In order for a physics engine 505 or an image processing system to determine if a node corresponds to an object or to a bounding volume, each node within the integrated acceleration data structure may contain an object node flag or bit. The object node bit may be a single bit located within the memory space which defines a node within the integrated acceleration data structure 900. According to one embodiment of the invention, if a node within the spatial index is an object node, the object node bit may be asserted. Furthermore, if a node within the spatial index is not an object node, the object node bit may not be asserted. Thus, a physics engine 505 performing physics calculations or the image processing system performing ray tracing may be able to quickly determine if the node is an object node or a node defining a bounding volume by determining if the object node bit is asserted.

Integrated Acceleration Data Structure Usage

According to embodiments of the invention, an image processing system may perform ray tracing with an integrated acceleration data structure. As described with regards to FIG. 4, when using a spatial index (e.g., a kd-tree) the image processing system may use a workload manager 205 to issue rays into the three-dimensional scene and to trace the rays (based on the trajectory of the ray) through the three-dimensional scene. The workload manager 205 may trace rays through the three-dimensional scene using the spatial index by performing ray-bounding volume intersection tests against the bounding volumes defined by the nodes in the spatial index. The workload manager 205 may take branches to nodes based on which bounding volumes are intersected by the ray. When the workload manager 205 traverses to a certain point within the spatial index (e.g., a leaf node defining a bounding volume), the workload manager 205 may send the ray to a vector throughput engine 210 to determine if the ray intersects any primitives (e.g., contained within the bounding volume defined by the leaf node). If the ray intersects a primitive, the vector throughput engine 210 may consequently determine the color contribution to the two-dimensional image based on an intersected primitive. If not, the workload manager 205 may traverse the kd-tree again to determine if the ray intersects any other primitives located within the three-dimensional scene.

The image processing system may use an integrated acceleration data structure 900 to perform ray tracing, in a manner similar to using a spatial index. The image processing system may issue rays into the three-dimensional scene and trace rays through the three-dimensional scene using the integrated acceleration data structure 900 by performing ray-bounding volume intersection tests against the bounding volumes defined by the spatially oriented nodes in the spatial index. The workload manager 205 may take branches to nodes based on which bounding volumes are intersected by the ray. When the workload manager 205 traverses to a certain point within the integrated acceleration data structure (e.g., an object node), the workload manager 205 may send the ray to a vector throughput engine 210 to determine if the ray intersects any primitives. However, according to other embodiments of the invention, the workload manager 205 may determine if the ray intersects any primitives.

Furthermore, the physics engine 505 may perform physics related tasks using the integrated acceleration data structure. When using a scene graph the physics engine may determine the effect of physical phenomena on objects within the three-dimensional scene 605 on an object-by-object basis. The physics engine 505 may perform the same physics calculations with an integrated acceleration structure on an object-by-object basis by searching for object nodes within the integrated acceleration data structure 900. The physics engine 505 may determine if a node is an object node by checking the object node bit in the information which defines the node. Once a node is found within the integrated acceleration data structure that has its object node bit asserted, the physics engine may perform physics calculations on the object.

Thus, by forming a data structure which uses both a spatial (or bounding volume) oriented hierarchy and an object oriented hierarchy, a single data structure may be formed which may be used by both the image processing system and the physics engine 505.

Although in the preceding example the integrated acceleration data structure 900 has been described wherein each entire object may be contained within a single bounding volume, in some circumstances portions of objects may be located within two separate bounding volumes. That is, objects within the three-dimensional scene may be divided by a splitting plane which creates a boundary between bounding volumes. Consequently, portions of an object may be located within separate bounding volumes created by the splitting plane.

In this scenario, according to one embodiment of the invention, the information defining an object node may contain a bit location which indicates that information which defines the entire object is located within a plurality of object nodes within the integrated acceleration data structure. The bit within the information defining an object node may be asserted to indicate that information which defines the object may be located within a plurality of object nodes of the integrated acceleration data structure, and de-asserted to indicate that the information which defines the object is located entirely within the current object node.

Furthermore, if an object node which contained only a portion of an object was created when constructing the integrated acceleration data structure, a pointer to another object node (or nodes) which contain the remaining information which defines the object may be stored in each object node (which contains a portion of the object, according to one embodiment of the invention. Thus, the physics engine may quickly find the other object node(s) within the integrated acceleration data structure. By using a bit within the information defining an object node to indicate whether or not the object is defined within a plurality of object nodes, the likelihood may be reduced that a physics engine 505 performing position updates or collision detection tests fails to perform tests against all of the portions of an object located within the three-dimensional scene.

Figure 10:
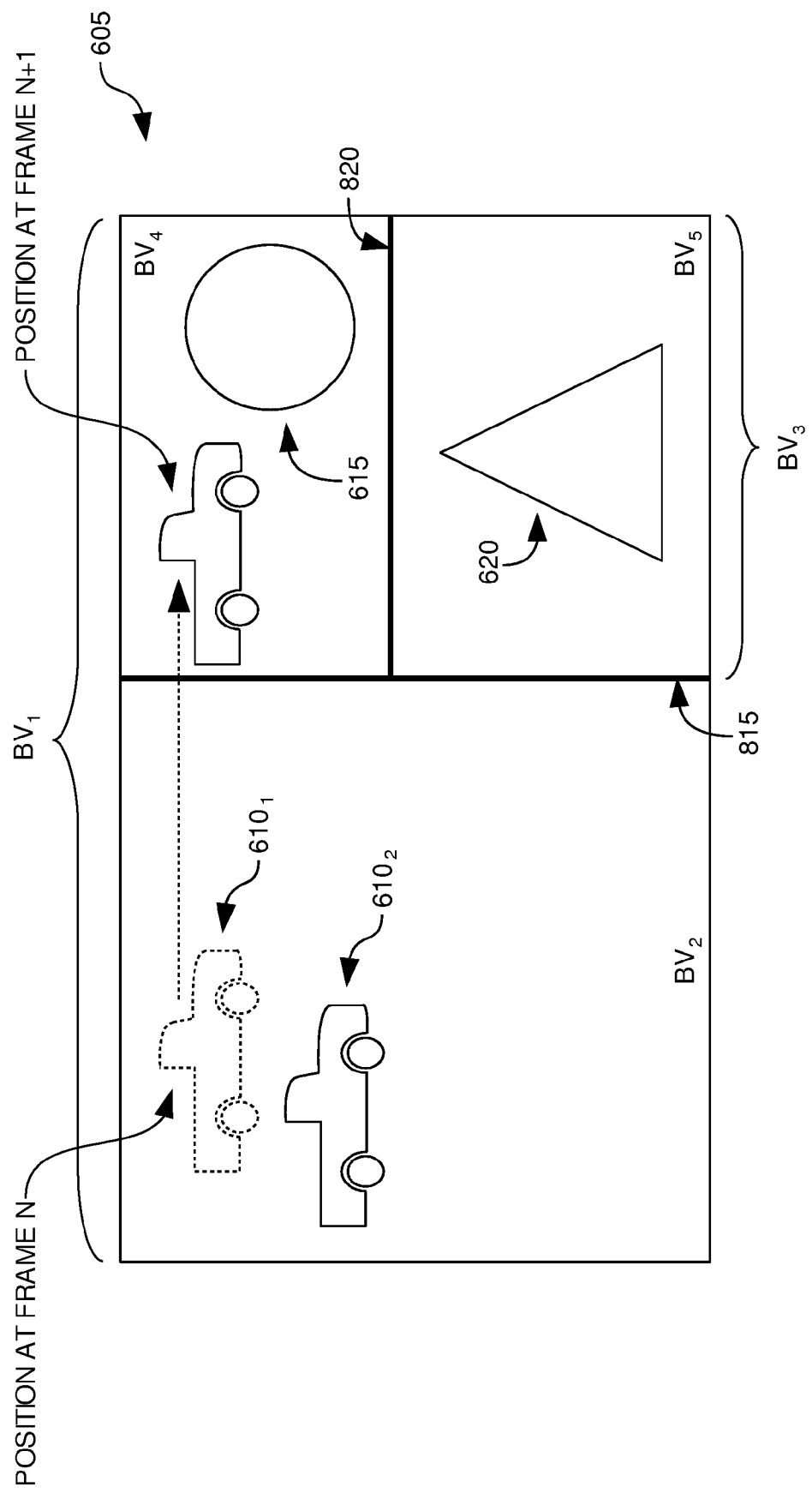
FIG. 10 illustrates a three-dimensional scene to be rendered by an image processing system, according to one embodiment of the invention.

Updating an Integrated Acceleration Data Structure in Response to Object Movements According to embodiments of the invention, an integrated acceleration data structure 900 may be used to maintain a record of movements or changes to objects located within the three-dimensional scene. For example, in contrast to the three-dimensional scene 605 illustrated in FIG. 6, FIG. 10 illustrates a three-dimensional scene 605B where the first car object 610$_1$ has moved from a first position in the frame N of the three-dimensional scene 605 to a second position in frame N+1 of the three-dimensional scene 605 (as illustrated by the dashed lines in FIG. 10).

In response to the movement of the first car object 610$_1$, hardware or software components within the image processing system may update the integrated acceleration data structure 900.

According to one embodiment of the invention, the physics engine 505 may update the integrated acceleration data structure 900 to reflect change in position or shape of objects within the three-dimensional scene 605. The physics engine 505 may perform position updates and collision detection tests for all of the objects located within the three-dimensional scene. For example, the object node 760 corresponding to the first car object 610$_1$ may be updated to reflect the new position of the first car object 610$_1$. After performing the tests, the physics engine 505 may record the results of the calculations (e.g., the new positions of the objects) in the integrated acceleration data structure 900.

Furthermore, if an object has moved such that the branches to nodes within the integrated acceleration data structure need to be updated, the physics engine 505 may update the branches as well. For example, the movement of the first car object 610$_1$ from its position illustrated in frame N of the three-dimensional scene 605 (as seen in FIG. 7) to its position illustrated in frame N+1 of the three-dimensional scene (as seen in FIG. 10) may require that the physics engine 505 update the position of the first car object 610$_1$ in the integrated acceleration data structure 900. Furthermore, as illustrated in FIG. 10 the first car object has moved to such a degree that it is no longer located within the bounding volume $BV_2$, rather the first car object 610$_1$ has moved such that it is located within the bounding volume $BV_4$. Thus, the physics engine 505 may update the integrated acceleration data structure 900 so that the node 865 corresponding to $BV_4$ branches to the object node 760 corresponding to the first car object 610$_1$.

Figure 11:
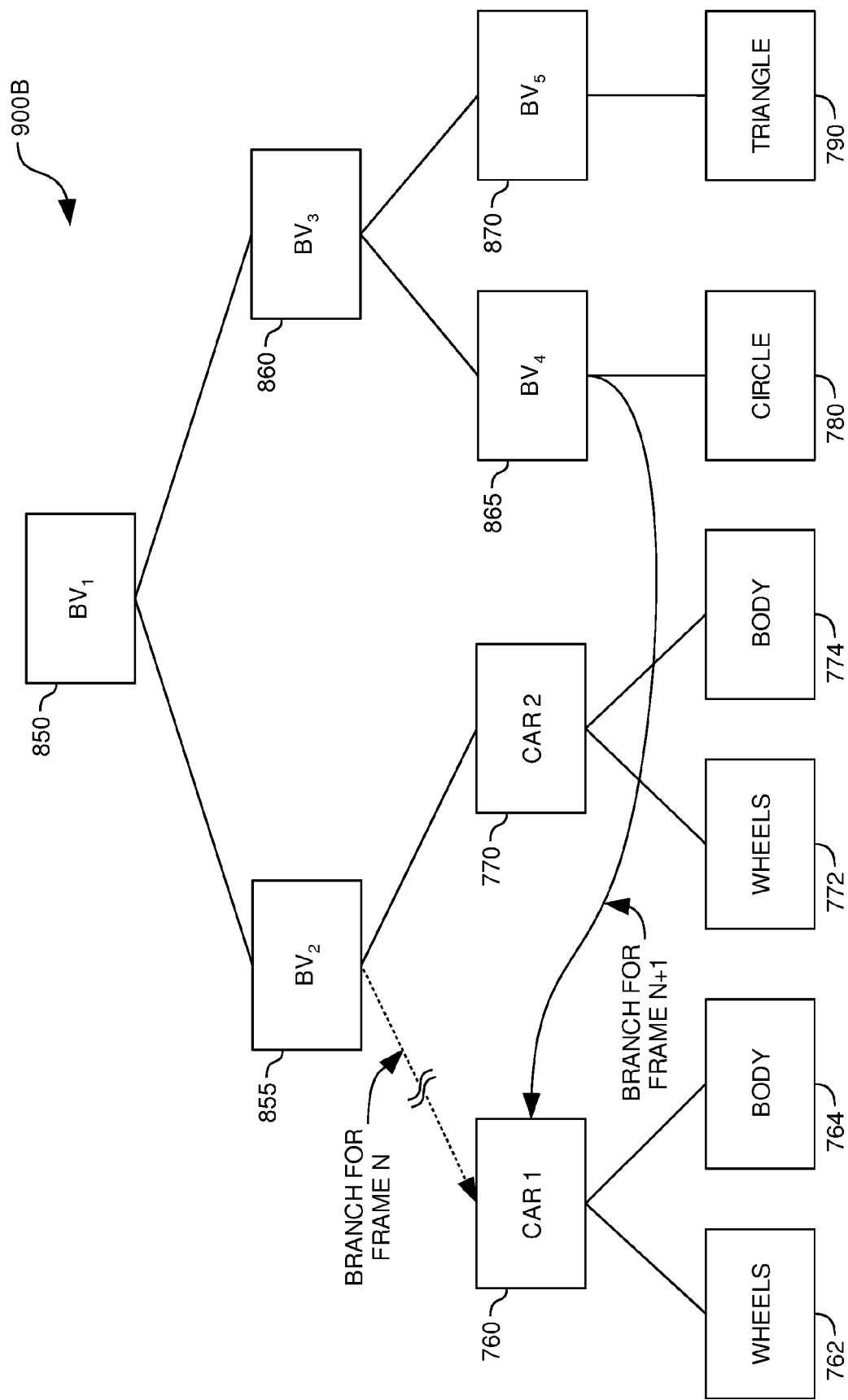

For example, FIG. 11 illustrates an updated integrated acceleration data structure 900B which reflects the new position of the first car object 610$_1$. The branch from the node 855 corresponding to $BV_2$ to the object node 760 corresponding to the first car object 610$_1$ may have been removed or deleted by the physics engine 505 to reflect the movement of the first car object 610$_1$ out of the bounding volume $BV_2$. Furthermore, a new branch from the spatial index node 865 corresponding to $BV_4$ to the object node 760 corresponding to the first car object 610$_1$ may have been added by the physics engine 505 to reflect the movement of the first car object 610$_1$ into the bounding volume $BV_4$. Thus, the new position of the first car object 610$_1$ in the three-dimensional scene 605 is now reflected in the updated integrated acceleration data structure 900B.

As illustrated in FIG. 11, the remaining nodes and branches in the updated integrated acceleration data structure 900B are the same as in the integrated acceleration data structure 900 because (in this simple example) no other objects moved from frame N to frame N+1. The image processing system may now use the updated integrated acceleration data structure 900B to render a two-dimensional image from the three-dimensional scene 605, and the physics engine 505 may use the updated integrated acceleration data structure 900B to perform physics related calculations.

Physics Engine Collision Detection

As mentioned above, one function of a physics engine is to perform collision tests. Collision tests may determine, for example, if an object which is moving within the three-dimensional scene collides with any other objects within the three-dimensional scene. If the moving object collides with any other objects, the physics engine may also perform calculations to determine the effects of the collision on the moving object and the objects with which the moving object collided (e.g., new direction, position, and/or shape of the objects). The physics engine may then update a data structure (e.g., the integrated acceleration data structure) with the results of the calculations, and the image processing system may use the updated data structure to render a two-dimensional image of the three-dimensional scene.

Figure 12:
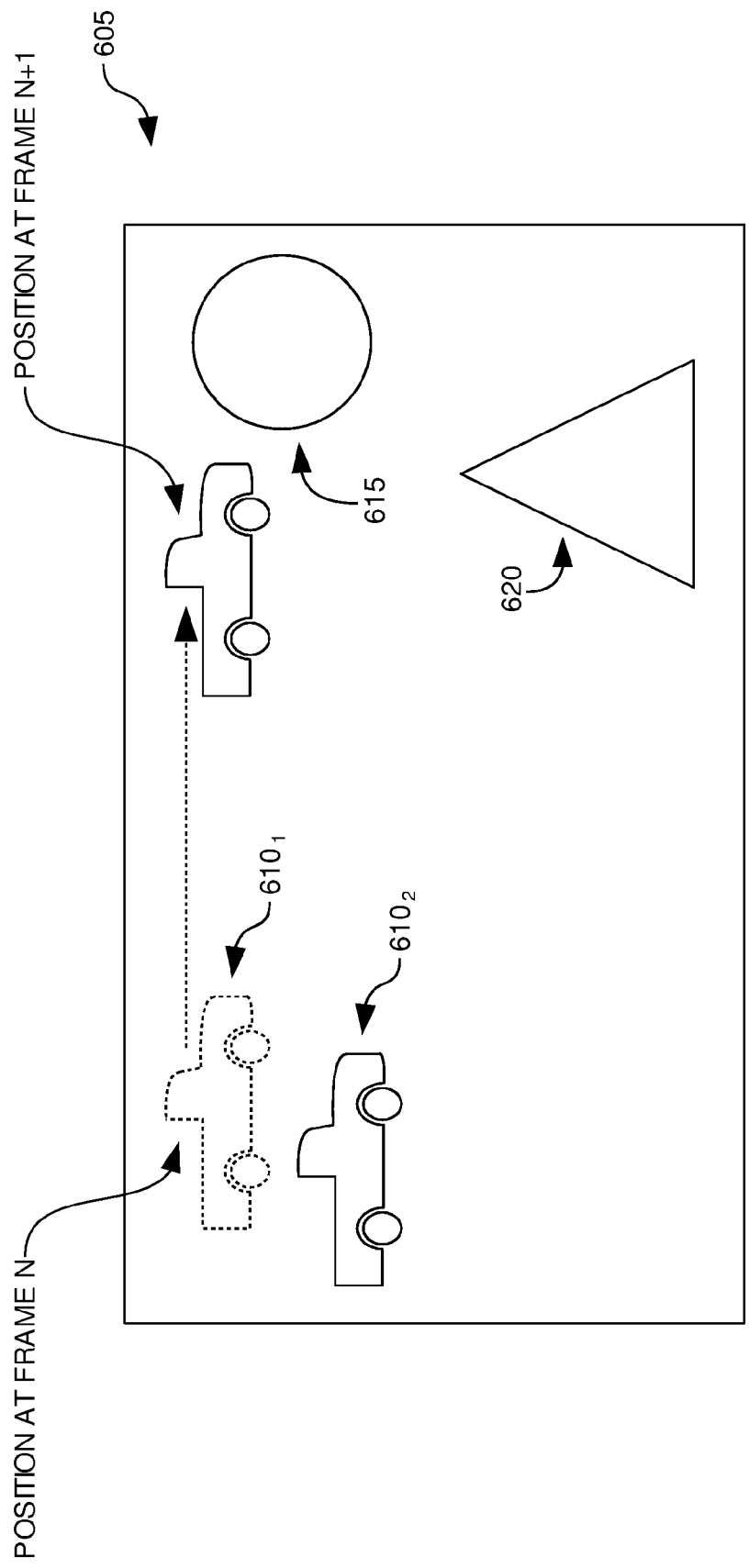
FIGS. 12, 13, and 16 illustrate exemplary three-dimensional scenes, according to embodiments of the invention.

FIG. 12 illustrates an exemplary three-dimensional scene 605 containing several objects including a first car object $610_1$, a second car object $610_2$, a circle object 615, and a triangle object 620. The first car object $610_1$ may moving (at a given velocity) within the three-dimensional scene. Over a period of time (e.g., a single frame) the car object $610_1$ may move from a first position (illustrated by the dashed outline of the car object $610_1$) to a second position.

In order to provide realistic simulation of physical phenomenon, the physics engine may perform collision tests (collision detection tests) with the first car object $610_1$ and each of the other objects within the three-dimensional scene to determine if the first car object $610_1$ collides with any other objects within the three-dimensional scene over the time period (e.g., for a single frame).

For example, the physics engine may perform collision tests with the first car object $610_1$ and the second car object $610_2$, the first car object $610_1$ and the circle object 615, and the first car object $610_1$ and the triangle object 620. Although this technique may determine which objects collide with the moving object, the technique may execute collision tests with objects which are unlikely to collide with the moving object. For example, this technique may execute a collision test with the first car object 6101 and the triangle object 620 which are relatively far away from one another and are unlikely to collide. Therefore, this technique may be inefficient in determining collisions between the moving object and other objects.

However, a physics engine may reduce the number of collision tests which may be performed by only performing collision tests with objects that are likely to collide with the moving object. The physics engine may determine which objects are likely to collide with the moving object by creating a bounding volume which encloses the path of the moving object from the first position to the second position (hereinafter a "velocity box") and performing intersection tests with the velocity box and every other object within the three-dimensional scene. The objects which intersect the velocity box may be more likely to collide with the moving object. Therefore, the physics engine may use the objects which intersect with the velocity box to perform collision tests with the moving object to determine which objects collide with the moving object. Consequently, the number of collision tests may be reduced by the number objects which do not intersect the velocity box.

In contrast to an object-to-object collision test, a test for an intersection of the velocity box and an object within the three-dimensional scene may take less time and processing power. For example, a collision test may require many more variables such as the velocity of the moving object, direction in which the moving object is traveling, the coordinates of both objects (i.e., the moving object and the object being tested), and the dimensions of both objects. Whereas, an intersection test may simply require the dimensions and coordinates of the velocity box and the dimensions and coordinates of the other object being tested for an intersection with the velocity box. Consequently, it may be more efficient to execute intersection tests using a velocity box than to execute collision tests with every object within the three-dimensional scene.

Figure 13:
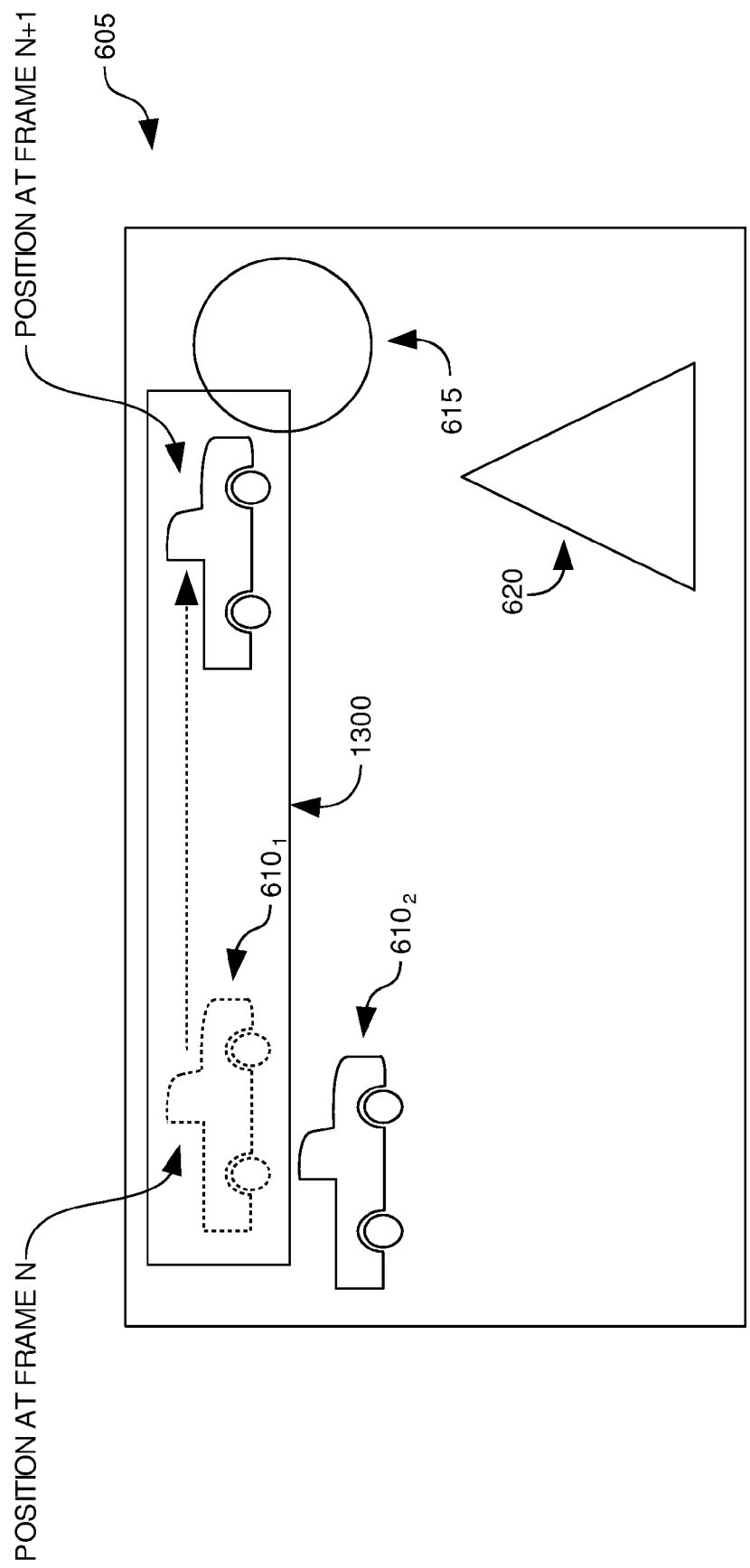

FIG. 13 illustrates an exemplary velocity box 1300 which encloses the moving first car object $610_1$. As illustrated the velocity box 1300 may be a simple rectangular box the dimensions of which are based on the dimensions of the moving object and the distance the moving object may move over the period of time under evaluation. The evaluation time period may be the period of a frame, or may be shorter and iterated many times for a single frame to prevent adverse effects (e.g. tunneling).

The velocity box may also be a more complex shape (e.g., a cylinder) which better reflects the path of the object from its initial position to its final position. A more complex shape may further reduce the number of objects which may collide with the velocity box. The complexity of the shape of the velocity box created by the physics engine may ultimately depend on a balance between the processing time necessary for the physics engine to create a more complex velocity box and the number of collision tests which may be reduced by creating a more complex velocity box.

After creating the velocity box 1300 the physics engine may perform intersection tests with the velocity box 1300 and objects within the three-dimensional scene 605. For example, intersection tests may be performed with the velocity box 1300 and the second car object $610_2$, the velocity box 1300 and the circle object 615, and the velocity box 1300 and the triangle object 620. As a result of performing these intersection tests, the physics engine may determine that the velocity box 1300 intersects the circle object 615 (the intersection of the velocity box 1300 and the circle object 615 is illustrated in FIG. 13). Thus, a collision between the first car object $610_1$ and the circle object 615 may be likely. Consequently, the physics engine may only need to perform a single collision detection test (i.e., with the first car object $610_1$ and the circle object 615).

By determining which objects are likely to intersect the moving first car object $610_1$ the physics engine was able to reduce the number of collision tests from three tests to one test. Although testing objects within the three-dimensional scene for intersections with the velocity box may add to the total number tests which may need to be performed from three tests to four tests (i.e., one collision test plus three intersection tests), the increase in tests will be less computationally expensive and consume less time than executing three collision tests. Therefore, the overall result may be a reduction in the time necessary to determine if the moving object collides with any other objects.

Box Casting Using an Integrated Acceleration Data Structure

Although intersection tests with a velocity box may reduce the number of collision tests which may need to be performed by the physics engine, the physics engine may still need to perform intersection tests with the velocity box and each object within the three-dimensional scene in order to determine which objects are likely to collide with the moving object. In a complicated three-dimensional scene containing many objects, this may result in a large number of intersection tests which may need to be performed to determine which collisions with the moving object are likely.

However, according to one embodiment of the invention, a physics engine may use the spatial information stored in the integrated acceleration data structure to determine which objects within the three-dimensional scene are within the same area as the velocity box and thus are likely to intersect the velocity box. Similar to how an image processing system may cast a ray into a three-dimensional scene and traverse the integrated acceleration data structure to determine objects which are intersected by the ray, according to embodiments of the invention, the physics engine may cast a velocity box into the three-dimensional scene and traverse the velocity box (based on the dimensions and location of the velocity box) through the integrated acceleration data structure to determine which bounding volumes the velocity box intersects (i.e., a portion of the velocity box exists within a bounding volume). The physics engine may then perform intersection tests with objects within the intersected bounding volumes (i.e., objects which are in the same area as the velocity box) which are more likely to intersect the velocity box.

Conversely, objects which are in bounding volumes which are not intersected by the velocity box may be excluded by the physics engine when performing intersection tests, because they are not in the same area as the velocity box and thus will not intersect the velocity box. Therefore, in contrast to a physics engine performing intersection tests with the velocity box and every other object within the three-dimensional scene, the physics engine may perform intersection tests with objects which are in the same bounding volumes and thus the same area as the velocity box. Consequently, the physics engine may reduce the number of intersection tests which may need to be performed.

Figure 14:
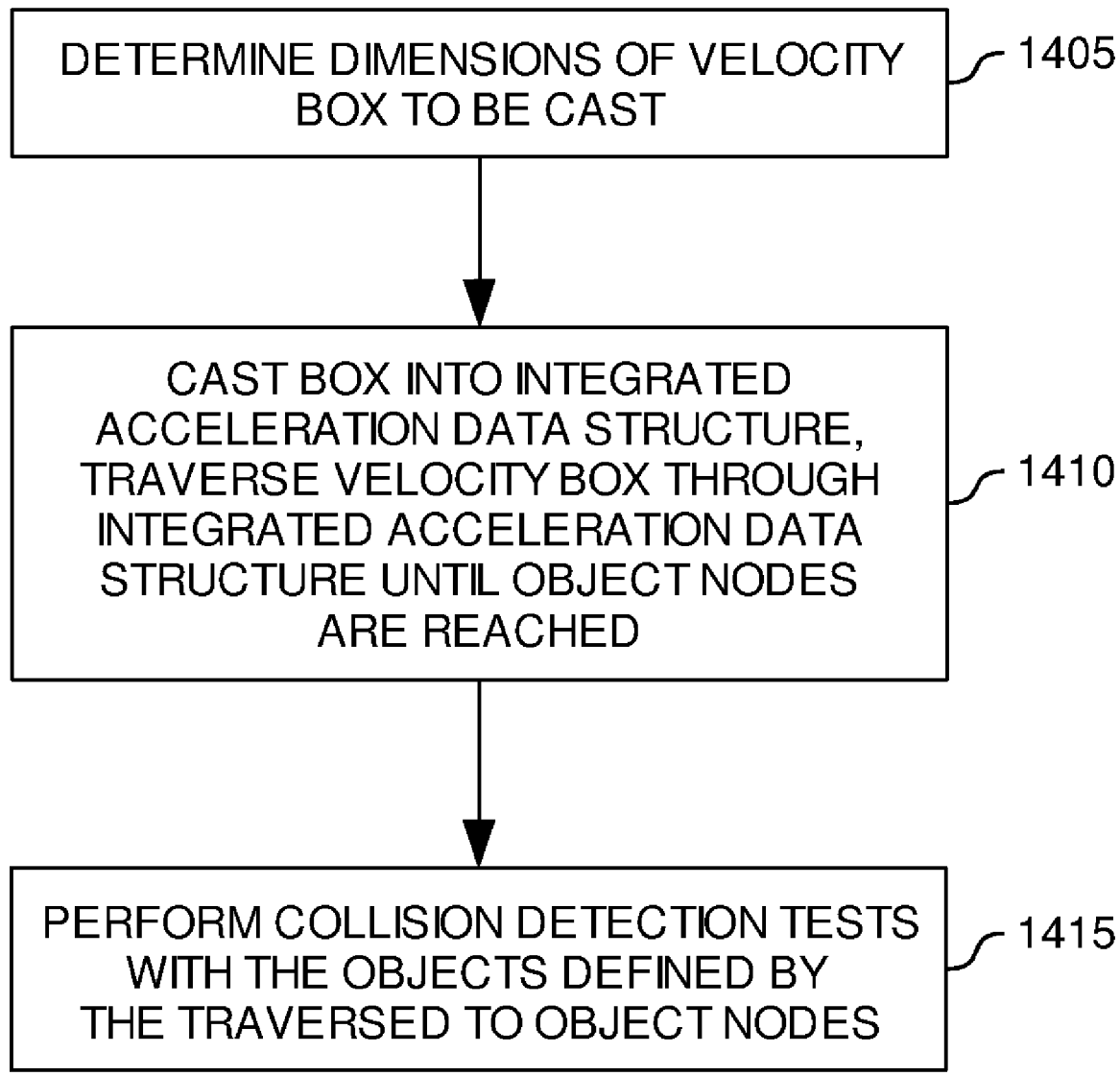
FIG. 14 is a flowchart illustrating an exemplary method of performing box casting, according to one embodiment of the invention.

FIG. 14 illustrates a method 1400 of casting a velocity box into an integrated acceleration data structure, according to one embodiment of the invention. The method 1400 may begin, for example, when a physics engine determines that an object will move within the three-dimensional scene. Initially, at step 1405, the physics engine may determine the dimensions of the velocity box to be cast into the three-dimensional scene.

As mentioned above, the dimensions of the velocity box may be determined based on the dimensions of the moving object and the amount of distance the moving object may travel over the time period under evaluation (e.g., a single frame). The dimensions of the velocity box should be such that it encompasses the moving object over the entire path of movement being evaluated. For example, the velocity box 1300 in FIG. 13 encompasses the first car object $610_1$ in both its first position and its second position (i.e., the amount of distance the first car object traveled). According to embodiments of the invention, the velocity box may be created such that is an axis-aligned velocity box (i.e., sides which are parallel or perpendicular to the axes which are used to create the spatial index) or may be created such that it is not axis-aligned (i.e., sides of the velocity box not parallel or perpendicular to the axes which are used to create the spatial index). However, an axis-aligned velocity box may be easier to traverse through the integrated acceleration data structure.

Next, at step 1410, the velocity box may be cast into the integrated acceleration data structure and traversed through the integrated acceleration data structure. This may entail testing bounding volumes defined by the nodes in the integrated acceleration data structure to determine if a portion of (or the entire) velocity box intersects or is within a bounding volume defined by a node. The physics engine may begin traversing the velocity box through the integrated acceleration data structure at the world node.

If a portion of the velocity box is located within the bounding volume defined by the world node, the physics engine may take the branches to the nodes beneath the world node. The nodes beneath the world nodes may define bounding volumes which are created by a splitting plane through the bounding volume defined by the world node (e.g., an axis-aligned splitting plane). The physics engine may determine if the velocity box, or a portion of the velocity box, is within the bounding volumes defined by the nodes below the world node. If so, the physics engine may take the branches from the nodes below the world node to nodes beneath or on a lower level of the integrated acceleration data structure. The bounding volume intersection tests and taking branches to nodes beneath nodes which defines bounding volumes intersected by the velocity box may continue until an object node is reached or a node is reached which does not contain a portion of the velocity box. The objects which are defined by the object nodes which are traversed to may be placed into a set of objects to be used later in intersection tests with the velocity box.

Figure 15:
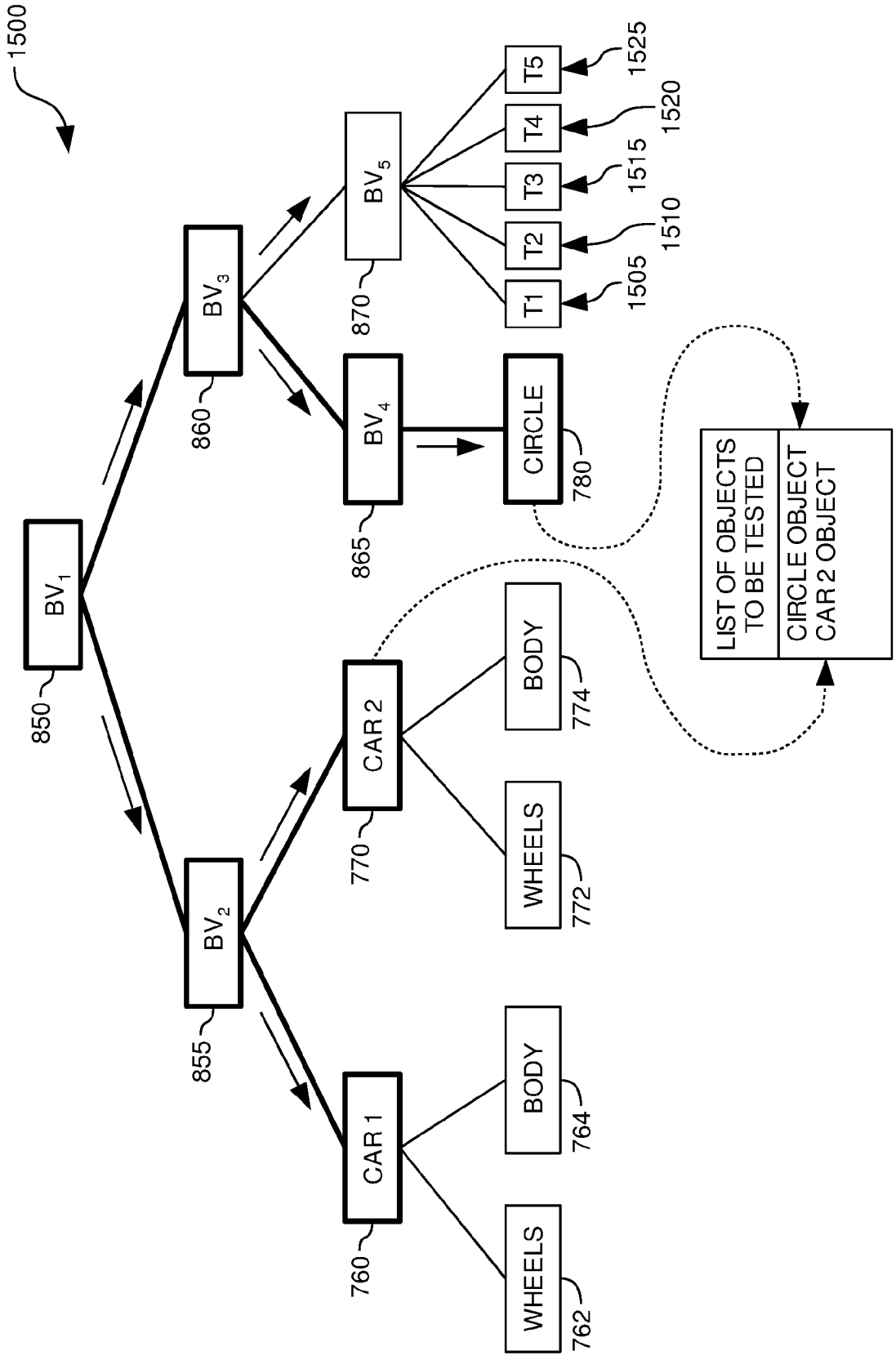
Figure 16:
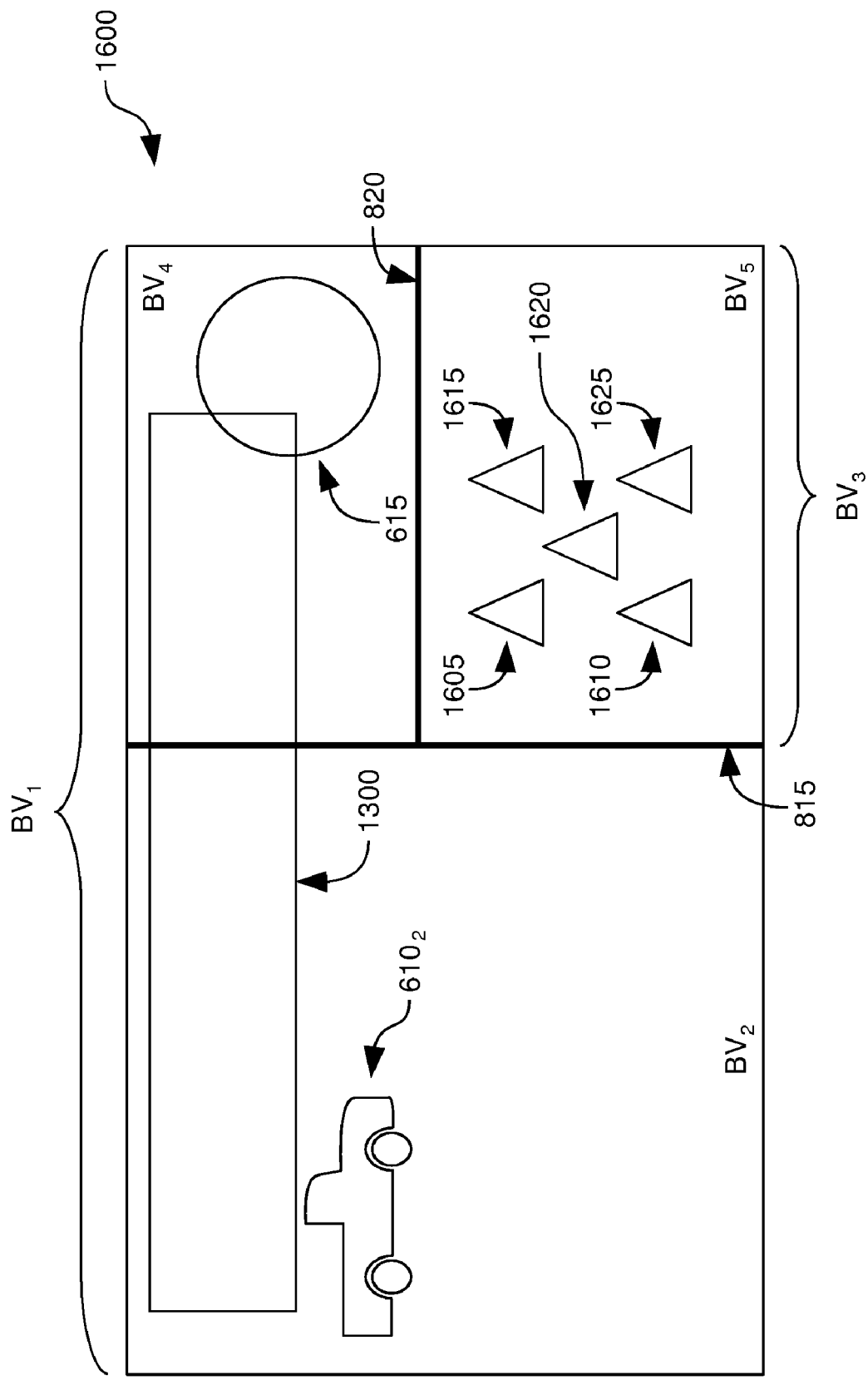

For example, FIG. 15 illustrates an integrated acceleration data structure 1500 which corresponds to a three-dimensional scene 1600 illustrated in FIG. 16. The integrated acceleration data structure contains nodes which define bounding volumes (e.g., $BV_1$-$BV_5$) within the three-dimensional scene 1600. The integrated acceleration data structure 1500 is similar to the earlier described integrated acceleration data structure 900 of FIG. 9 with the exception of several object nodes (i.e., object node 1505, object node 1510, object node 1515, and object node 1520) which correspond to objects located within a bounding volume (i.e., $BV_5$) of the three-dimensional scene 1600.

The physics engine may begin traversing the velocity box 1300 (illustrated in FIG. 1600) through the integrated acceleration data structure 1500 by determining if the velocity box 1300 is within or intersects the bounding volume defined by the world node 850 (i.e., $BV_1$). As can be seen in FIG. 16, the velocity box 1300 is within the bounding volume defined by the world node 850 (i.e., $BV_1$), and therefore the results of the physics engine's determination will indicate the intersection. An intersection of the velocity box 1300 with a bounding volume defined by nodes (e.g., world node 850) in the integrated acceleration data structure 1500 is illustrated in FIG. 15 by the darkened outline of the nodes (e.g., the darkened outline of the world node 850).

Next, the physics engine may continue to traverse the integrated acceleration data structure 1500 by taking the branches from the world node 850 to the nodes beneath the world node 850 (i.e., node 855 and node 860). The physics engine may then perform tests to determine if the velocity box 1300 intersects or is within the bounding volumes defined by the nodes beneath the world node 850 (i.e., $BV_2$ and $BV_3$). The physics engine may determine from these tests that the velocity box 1300 is within or intersects the bounding volumes defined by the nodes beneath the world node 850 (i.e., the velocity box 1300 intersects both $BV_2$ and $BV_3$). The physics engine may then continue traversing the integrated acceleration data structure 1500 by taking the branches from the intersected nodes to the nodes beneath the intersected nodes.

As illustrated in FIG. 15, the physics engine may take a branch from node 855 (defining bounding volume $BV_2$) to the first car object node 760 and another branch from node 855 to the second car object node 770. Consequently, the second car object $610_2$ is in the same areas as the velocity box 1300, and is likely to intersect the velocity box 1300. Therefore, the physics engine may add the second car object $610_2$ to a list of objects which may be used later in intersection tests to determine which objects intersect the velocity box 1300. While the first car object $610_1$ may be within the same area as the velocity box 1300, the first car object $610_1$ may be excluded from the intersection tests by the physics engine because the first car object is the moving object.

The physics engine may also take the branches from node 860 (defining bounding volume $BV_3$) to nodes beneath node 860 (i.e., node 865 and node 870). Both node 865 and node 870 define bounding volumes (i.e., $BV_4$ and $BV_5$), not object nodes. Therefore, the physics engine may perform tests to determine if the velocity box is within or intersects the bounding volumes defined by node 865 and node 870. As can be see in FIG. 16, part of the velocity box 1300 is within $BV_4$ but no portion of velocity box 1300 is within $BV_5$. Therefore, the results of the intersection tests may indicate that a portion of the velocity box is within the bounding volume defined by node 865 (i.e., $BV_4$), but that no portion of the velocity box is within the bounding volume defined by node 870 (i.e., $BV_5$). The intersection with $BV_4$ and not $BV_5$ is illustrated in FIG. 15 by the darkened outline of node 865 which corresponds to $BV_4$, but no darkened outline of node 870 corresponding to $BV_5$. Consequently, the physics engine may take branches from node 865 but not from node 870. As illustrated in FIG. 15, the branch from node 865 leads to the object node 780 which corresponds to the circle object 615 contained within bounding volume $BV_4$. Consequently, the circle object 615 may be in the same area of the velocity box 1300 and thus is likely to intersect the velocity box 1300. Therefore, the physics engine may add the circle object 615 to a list of objects which may be later used intersection tests to determine which objects intersect with the velocity box 1300. However, the physics engine may not use the objects located within $BV_5$ (i.e., triangle objects 1605-1625) and branched to from node 870 because those objects are not in the same area as the velocity box.

After the physics engine has finished traversing the velocity box through the integrated acceleration data structure, the physics engine may proceed to step 1415 of method 1400 to perform intersection tests with the list of objects which are defined by the traversed to objects nodes in the integrated acceleration data structure. The results of these intersection tests indicate which objects intersect with the velocity box and therefore are likely to collide with the moving object. The physics engine may use those objects when performing collision tests with the moving object. The results of the collision tests may indicate which objects actually collide with the moving object. Consequently, the physics engine may calculate new positions of the moving object and the objects which intersect the moving object and store the new positions, for example, within the integrated acceleration data structure. The image processing system may use the updated integrated acceleration data structure to render a two-dimensional image using the new positions of the objects in the three-dimensional scene.

For example, as was determined by traversing velocity box 1300 through the integrated acceleration data structure 1500, the physics engine may perform intersection tests with the second car object $610_2$ and the circle object 615 which were contained within the traversed to bounding volumes (i.e., $BV_2$ and $BV_4$, respectively). The intersection tests may determine that only the circle object 615 intersects the velocity box 1300. Consequently, the physics engine may perform a collision test with the moving object (i.e., the first car object $610_1$) and the circle object 615. In contrast to a physics engine which does not cast the velocity box into the three-dimensional scene and traverse the velocity box through the three-dimensional scene, the physics engine may reduce the number of velocity box/object intersection tests by five. The reduction in five intersection tests is due to the physics engine not performing intersection tests with the five triangle objects (i.e., triangle objects 1605-1625) which are contained within the bounding volume which was not intersected by the velocity box (i.e., $BV_5$). In comparison a physics engine which does not traverse the velocity box through an integrated acceleration data structure, rather merely performs intersection tests with the velocity box and every other object within the three-dimensional scene will execute intersection tests with the velocity box and the triangle objects (i.e., triangle objects 1605-1625).

Although, in the present example, the reduction in calculations is relatively small, in a three-dimensional scene containing many objects, casting a velocity box into the scene and traversing the velocity box through the integrated acceleration data structure to determine which objects may be used in collision tests may result in a substantial reduction in calculations. Consequently, the processing time required to perform physics simulation may be substantially reduced.

In addition to reducing the number of objects which may need to be tested against to determine if the moving object collides with other objects, box casting may be used to parallelize physics calculations in a multi-processor environment. For example, a physics engine may use box casting to parallelize collision detection in the multiple-core processing element 100 or in the network of multiple-core processing elements 200.

According to one embodiment of the invention, a physics engine may parallelize collision detection by box casting to determine which objects a moving object is likely to collide, and then using separate processing elements to determine if the moving object collides with any of the objects which are likely to collide with the moving object. The separate processing elements may perform intersection tests and collision detection tests to determine if the moving object collides with any of the objects which are likely to collide with the moving object.

For example, a physics engine may use box casting to determine that two objects are likely to intersect a moving object. The physics engine may then use a thread of a first processing element (e.g., a BTE 105) to execute intersection tests and collision tests to determine if the moving object collides with a first of the two objects, and a thread of a second processing element (e.g., a BTE 105) to execute intersection tests and collision tests to determine if the moving object collides with a second of the two objects. Thus, the physics engine may parallelize collision detection by using box casting and two separate processing elements.

Artificial Intelligence System

An artificial intelligence system (AIS) may be used in combination with a game engine or game system to simulate aspects of human intelligence. For example, an AIS may be used to control various characters in a video game such that the characters make human-like decisions or exhibit human-like behavior. Thus, an AIS may be used with the physics engine and the image processing systems described above, for example, in a game system.

Figure 17:
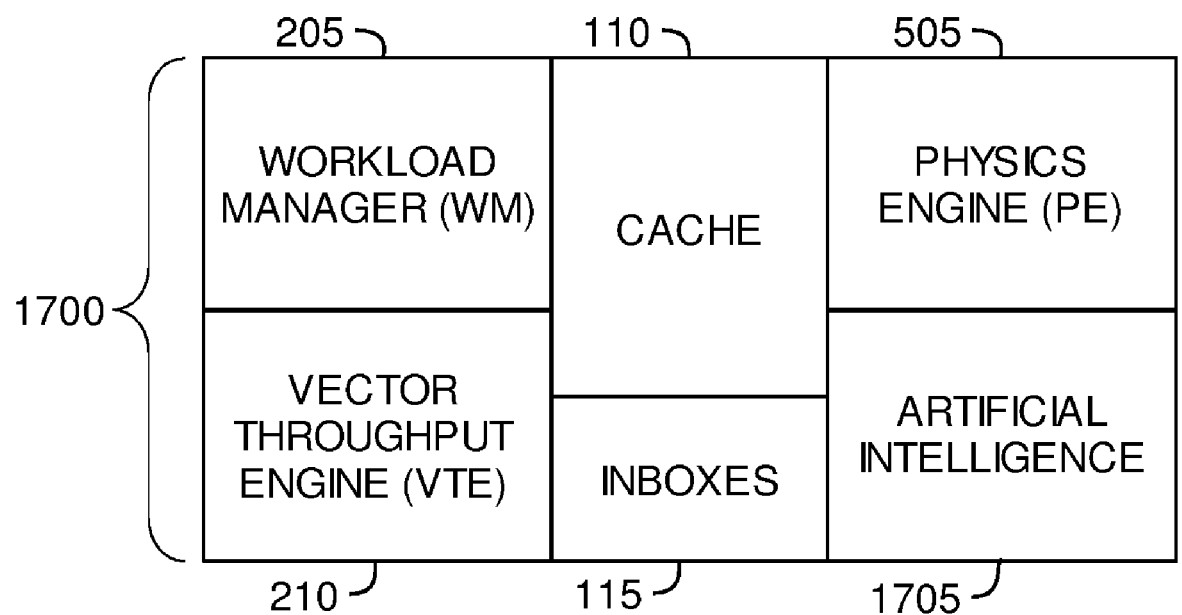

An AIS may be constructed of various software and hardware components in a computer or game system. According to one embodiment of the invention, an AIS may use multiple threads on a multiple core processing element to perform artificial intelligence related calculations. For example, FIG. 17 illustrates a multiple core processing element 1700 wherein the threads of one of the processing elements (cores) are allocated to an AIS 1705. Other cores within the multiple-core processing element may perform image processing related tasks and physics related tasks, according to embodiments of the invention. For example, one core within the multiple-core processing element 1700 may be allocated to a workload manager 205, another allocated to vector throughput engine 210, and another core allocated to a physics engine 505 according to one embodiment of the invention.

The multiple-core processing element 1700 may have a memory cache 110 shared between all of the cores located on the multiple-core processing element 100. Furthermore, each core may have its own cache (e.g., an L1 cache). The multiple-core processing element 100 may also contain inboxes 115. The inboxes 115 may be memory mapped address space used by the cores as a communications network.

Utilizing Ray Tracing for Enhanced Artificial Intelligence Path-Finding

As described above, an AIS may be used in a game system, for example, to simulate human-like behaviors for characters to interact with objects (including other characters) within a three-dimensional scene. One human-like behavior which may be simulated by the AIS is path-finding. This is the process of finding a un-obscured path between a starting point and an ending point in a scene containing obstacles. According to embodiments of the invention, ray tracing may be used to perform artificial-intelligence path finding.

Figure 18:
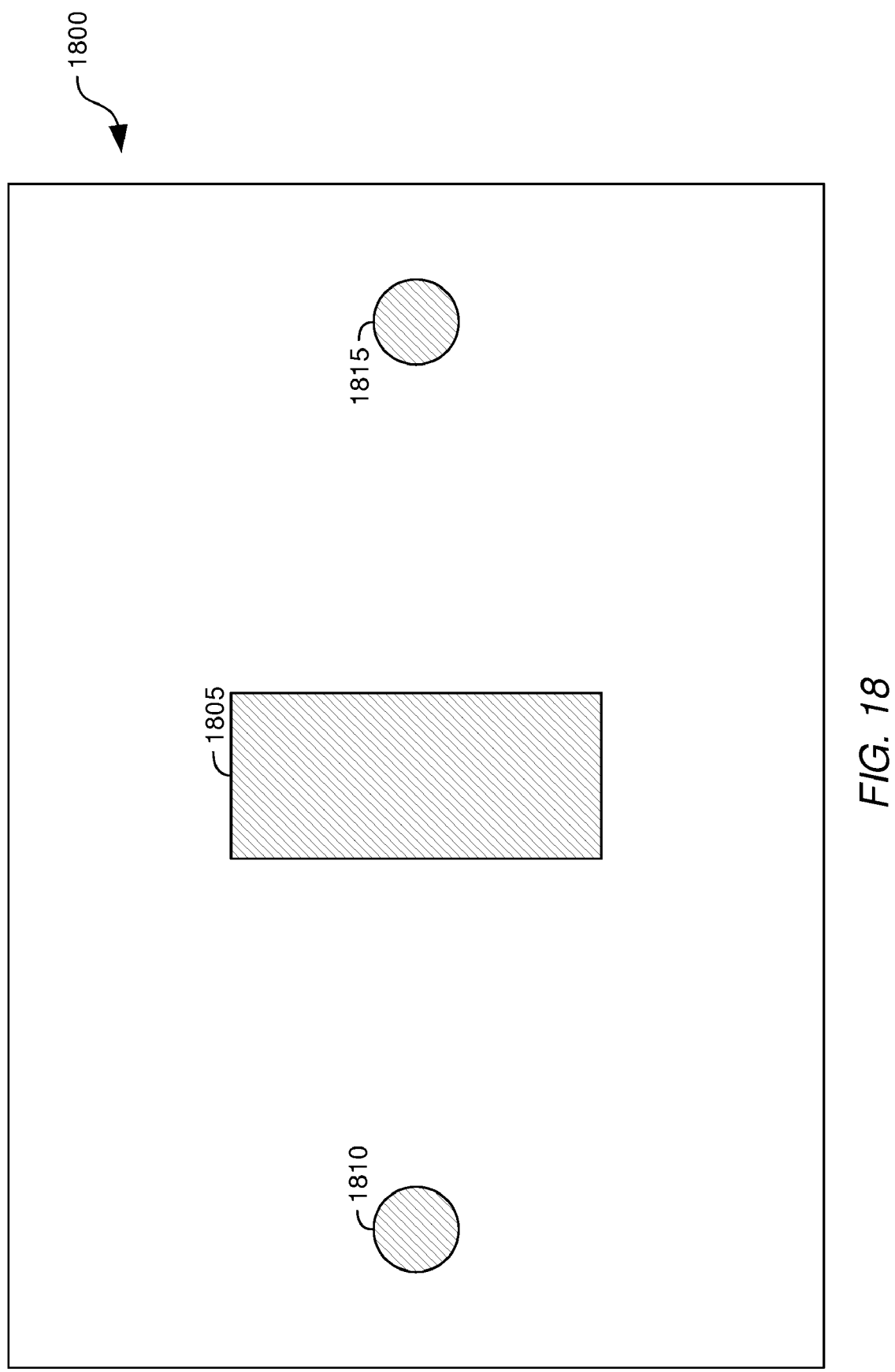
FIGS. 18, 20-23, and 25 illustrate exemplary three-dimensional scenes containing objects, according to embodiments of the invention.
Figure 19:
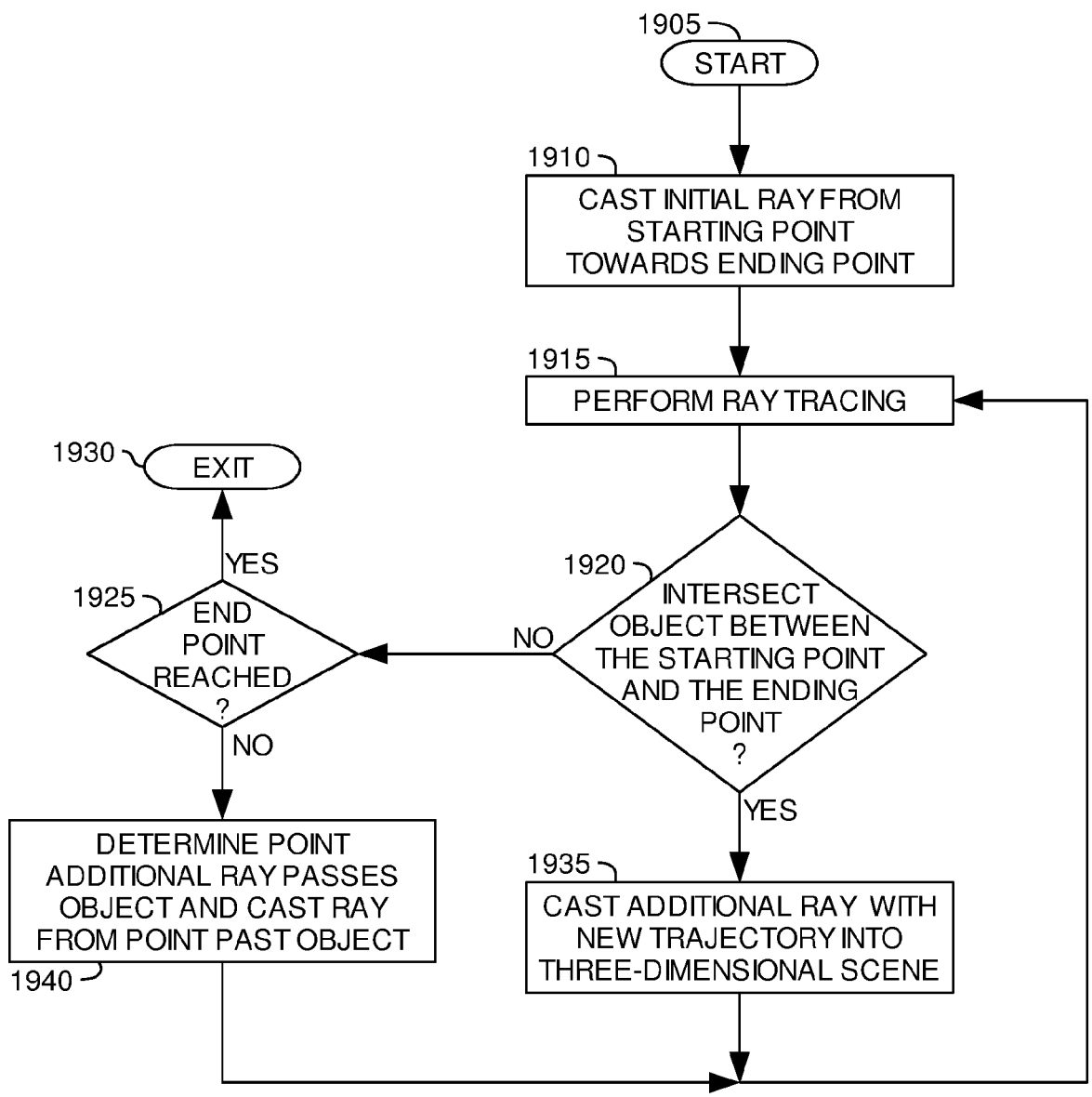
FIGS. 19 and 24 are flowcharts illustrating exemplary methods of performing artificial-intelligence path-finding, according to embodiments of the invention.

FIG. 18 illustrates an exemplary three-dimensional scene 1800 which an AIS may determine a path between a starting point 1810 and an ending point 1815. The three-dimensional scene 1800 illustrated in FIG. 18 also contains an object 1805 which may obstruct a possible path between the starting point 1810 and the ending point 1815. FIG. 19 illustrates an exemplary method 1900 of using ray tracing to perform artificial-intelligence path-finding, according to one embodiment of the invention.

The method 1900 may begin at step 1905, for example, when the AIS is requested to, or needs to, find a path between a starting point and an ending point in a three-dimensional scene containing obstacles. Next, at step 1910, the AIS may cast or generate an initial ray into the three-dimensional scene. The initial ray cast by the AIS may begin at the starting point and may have a trajectory directed towards the ending point.

Figure 20:
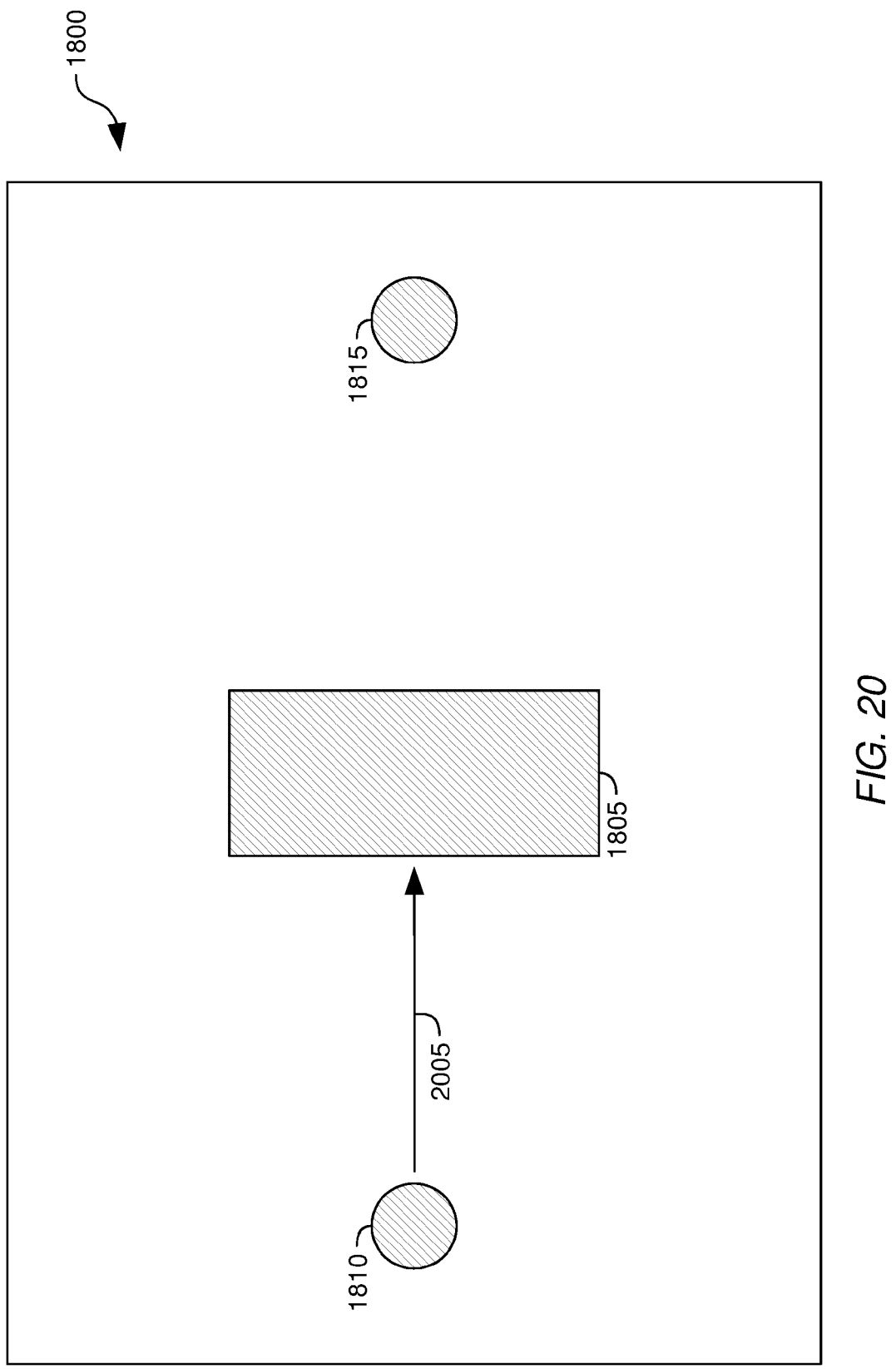

For example, FIG. 20 illustrates an initial ray 2005 which may have been issued by the AIS in step 1910. As illustrated in FIG. 20, the initial ray 2005 issued into the three-dimensional scene begins at the starting point 1810 and has a trajectory (illustrated by the arrow in FIG. 20) directed towards the ending point 1815.

After issuing an initial ray into the three-dimensional scene, at step 1915, the AIS may perform ray tracing with the initial ray. The AIS may perform ray tracing with the initial ray similar to how an image processing system may perform ray tracing as described above with respect to FIG. 4. That is, the AIS may use a spatial index (e.g., integrated acceleration data structure, kd-tree, etc.) to trace the initial ray through the three-dimensional scene. The spatial index may contain nodes corresponding to bounding volumes which partition the three-dimensional scene. The AIS may take branches to nodes in the spatial index which correspond to bounding volumes intersected by the initial ray. The AIS may take branches to nodes until a leaf node containing primitives is reached, or in the case of a combined spatial index, until an object node is reached. Once an object node or leaf node is reached, the AIS may perform ray-primitive or ray-object intersection tests to determine if the initial ray intersects a primitive or an object within the three-dimensional scene.

The three-dimensional scene may have been partitioned by the image processing system or some other system prior to the AIS commencing the path-finding method 1900. For example, the physics engine or the image processing system may have created the spatial index for physics simulation purposes or image processing purposes, respectively. Those systems may have stored the spatial index in a location accessible by the AIS (e.g., memory cache 110). Consequently, the AIS may use the same spatial index (acceleration data structure or combined spatial index) which was created for or by the image processing system to perform ray tracing with the initial ray 2005. By using the spatial index created by the physics engine or the image processing system, the AIS may reduce the amount of space required to store a data structure to be used when determining a path between the starting point and the ending point.

As the initial ray is being traced through the spatial index, or after the initial ray has been traced through the spatial index, the AIS may determine, at step 1920, if the initial ray intersected any objects within the three-dimensional scene between the starting point and the ending point. If the ray did not intersect any objects within the three-dimensional scene between the starting point and the ending point, the AIS may proceed to step 1925 to determine if the ending point was reached. If so, the AIS may end the method 1900 at step 1930 and the determined path is the path of the initial ray from the starting point to the ending point.

However, in some circumstances an obstacle may be present within the three-dimensional scene. For example, as illustrated in FIG. 20 the object 1805 may be present within the three-dimensional scene. Consequently, at step 1920 of method 1900, the AIS may determine that when traversing the initial ray through the spatial index that the initial ray intersects the object. For example, as illustrated in FIG. 20, the initial ray 2005 intersects the object 1805.

If at step 1920 the AIS determines that the initial ray intersected an object, the AIS may proceed to step 1935. At step 1935 the AIS may cast an additional (different) ray into the three-dimensional scene. The additional ray may have a trajectory which differs only slightly from the trajectory of the initial ray. By slightly varying the trajectory of rays after a previous ray was determined to intersect an object within the three-dimensional scene, the AIS may search for an alternate path. That is, the AIS may search for an alternate path which does not intersect the object which was intersected by the previously issued ray (e.g., the initial ray), and yet does not drastically differ from the path of the initial ray. By searching for an alternate path which does not drastically differ from the path of the initial ray, the AIS searches for the shortest alternate path since the shortest path (i.e., the path of the initial ray) is obstructed by an object.

Figure 21:
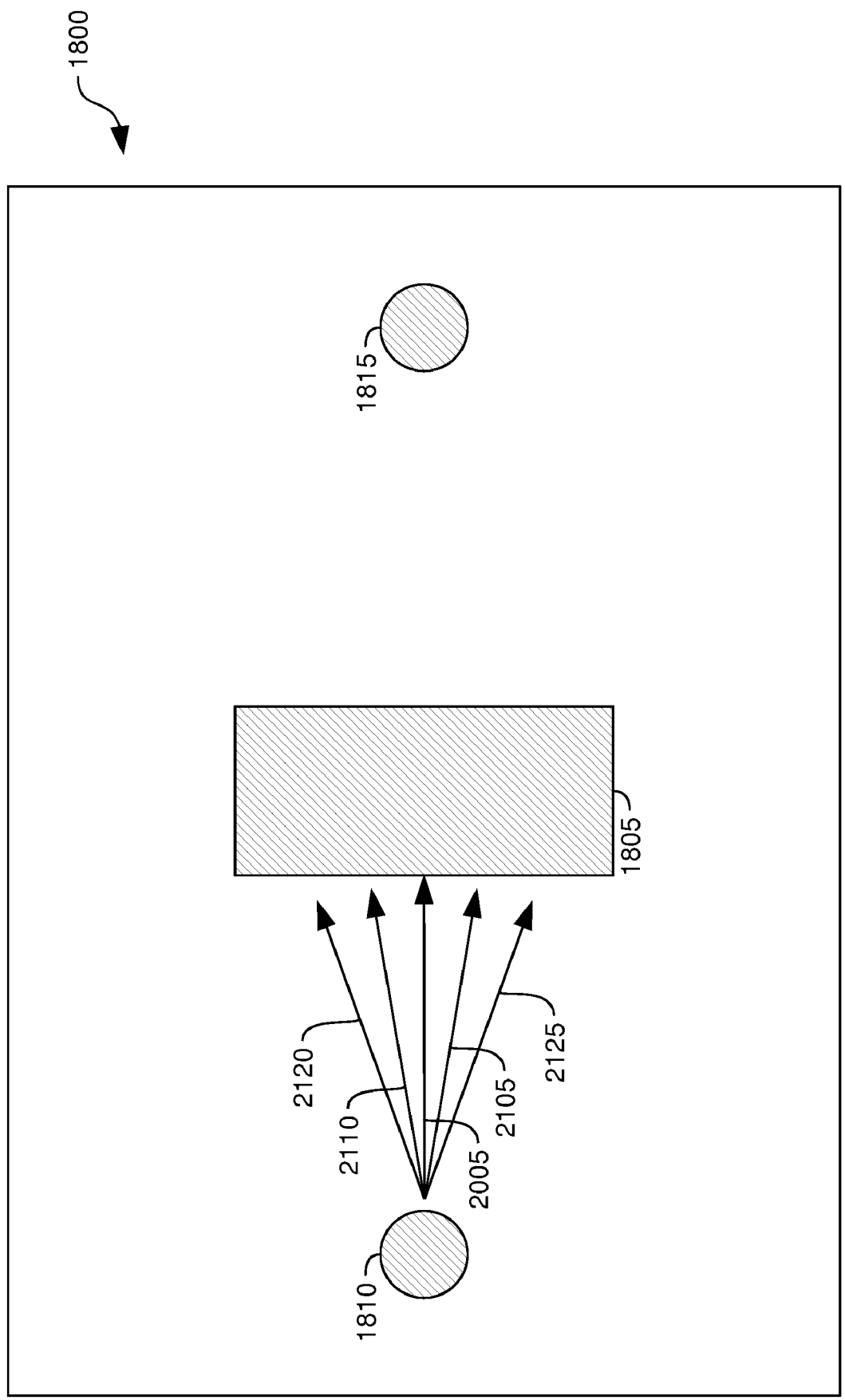

For example, FIG. 21 illustrates an additional ray 2105 which may be cast by the AIS at step 1935. As illustrated in FIG. 21, the additional ray 2105 has a trajectory which slightly differs from the initial ray.

After issuing the additional ray into the three-dimensional scene, the AIS may return to step 1915 to perform ray tracing with the additional ray. Next, at step 1920, the AIS may determine if the additional ray intersects any objects within the three-dimensional scene. If so, the AIS may proceed to step 1935 to issue another additional ray into the three-dimensional scene.

For example, although the trajectory of the additional ray 2105 differs from that of the initial ray 2005 (e.g., slightly below the trajectory of the initial ray), the additional ray also intersects the object 1805. Thus, the AIS may proceed to step 1935 to issue another additional ray into the three-dimensional scene. Although the newest additional ray may also begin at the starting point, the additional ray may differ in trajectory from both the initial ray and the previously issued additional ray in trajectory. According to one embodiment of the invention, the additional ray may have a trajectory on the opposite side of the initial ray than the previously issued additional ray.

For example, FIG. 21 illustrates an additional ray 2110 issued after the previously issued additional ray 2105 intersected the object 1805. As illustrated in FIG. 21 the additional ray 2110 has a trajectory different than that of the initial ray 2005 and the previously issued additional ray 2105. Also, the trajectory of the additional ray 2110 is on the opposite side of the initial ray 2005 than the previously issue additional ray 2105.

By altering the sides of the initial ray which additional ray is issued the AIS may attempt to find a path towards the end point which does not intersect the object which was intersected by the initial ray and the previously issued additional ray or rays. The AIS may continue in the loop of issuing additional rays and performing ray tracing with the additional rays (step 1935 and step 1915) until a ray is issued which does not intersect the object. The AIS may gradually increase the difference in trajectory from the initial ray as the AIS issues more additional rays. Thus, the AIS may issue rays which search for a path which does not intersect the object. By gradually increasing the difference from the initial ray, the AIS may search for the shortest alternate path around the object which does not intersect the object.

For example, as illustrated in FIG. 21, the AIS may issue two more additional rays into the three-dimensional scene (i.e., additional ray 2115 and additional ray 2120). However, both of these additional rays may also intersect the object 1805.

By increasing the difference in trajectory, the AIS may eventually issue an additional ray which does not intersect the object. Thus, at step 1920, the AIS may determine that an issued additional ray does not intersect the object which was intersected by previously issued rays and the initial ray. The AIS may then proceed to step 1925 to determine if the ending point has been reached by the additional ray. If the ending point has not been reached by the additional ray, the AIS may proceed to step 1940, where the AIS may determine a point in the three-dimensional scene where the additional ray passes the object. The AIS may then issue a new ray from the point where the additional ray passes the object and with a trajectory directed towards the end point. The AIS may then return to step 1915 to perform ray tracing with the new ray to determine if the new ray intersects an object and, if not, to determine if the new ray reaches the ending point. If the new ray does reach the ending point, then AIS may proceed to step 1930 where the method 1900 may end.

Figure 22:
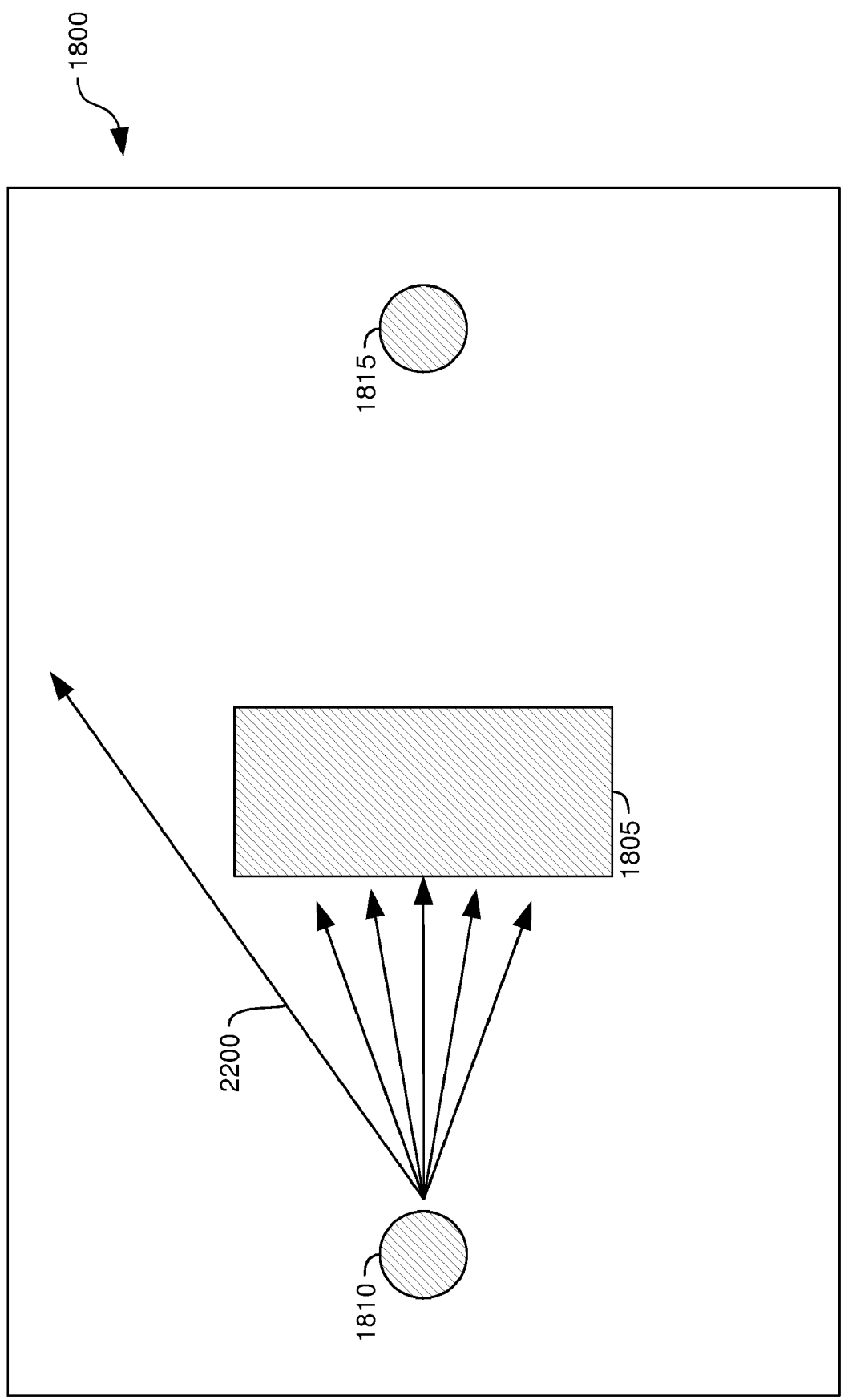

For example, as illustrated in FIG. 22 the AIS may issue additional ray 2200 into the three-dimensional scene 1800, and the additional ray 2200 may have a trajectory such that it does not intersect the object 1805. Thus, the AIS may proceed from step 1920 to step 1925 to determine if the additional ray 220 intersects the ending point. As illustrated in FIG. 22, the additional ray does not intersect the ending point. Consequently, the AIS may proceed from step 1925 to step 1945 where the AIS may determine a point where the additional ray 2200 passes the object 1805.

Figure 23:
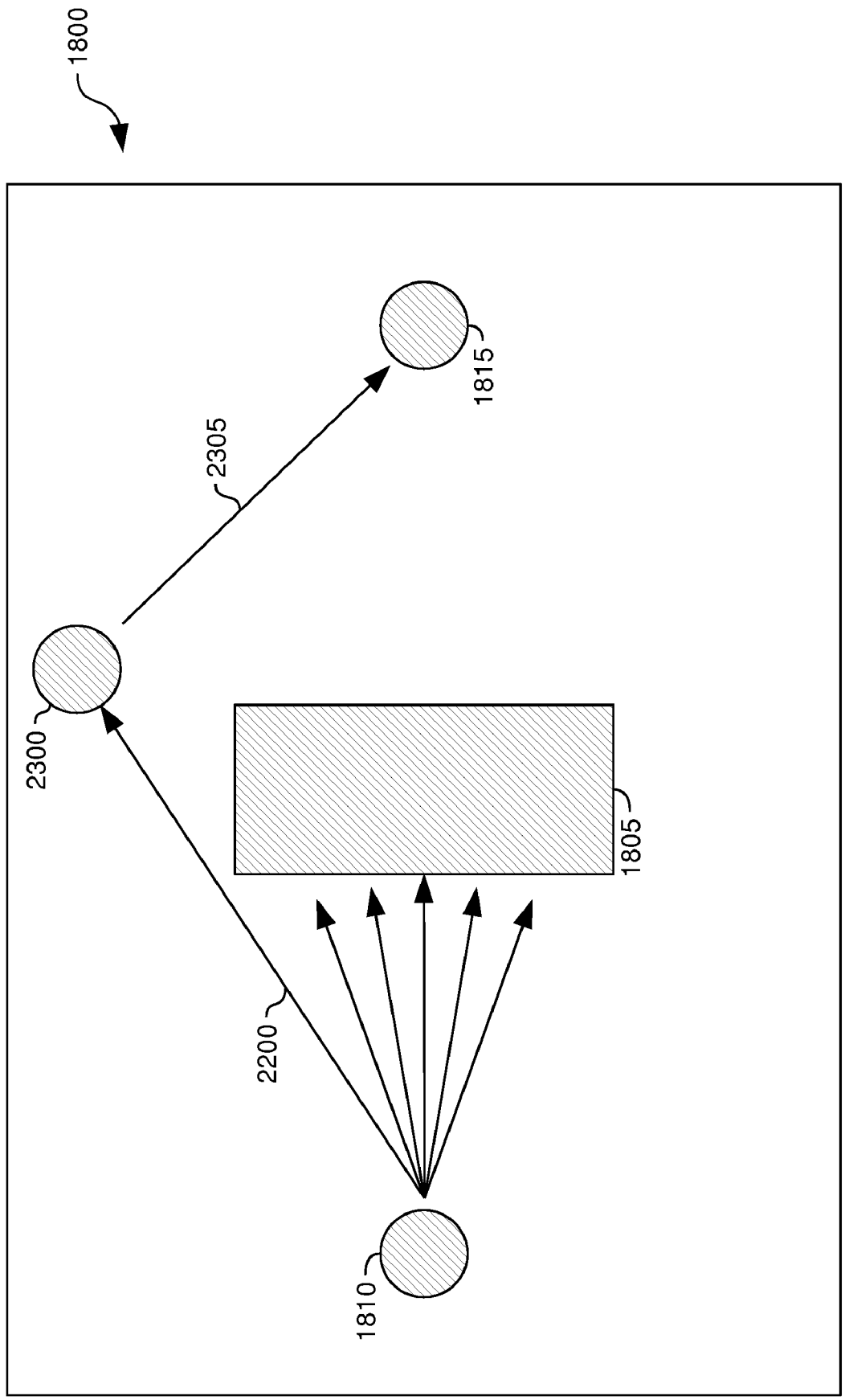

As illustrated in FIG. 23, the AIS may determine a point 2300 where the additional ray passes the object 1805. Furthermore, the AIS may issue a new ray into the three-dimensional scene with a trajectory directed towards the ending point. FIG. 23 also illustrates a new ray 2305 issued into the three-dimensional scene 1800 from the point 2300 past the object 1805 and with a trajectory (illustrated by the arrow) directed towards the ending point 1815. FIG. 23 also illustrates that the new ray 2300 does not intersect any objects and, consequently, does intersect or reach the ending point 1815. Thus, the path determined by the AIS is along the additional ray 2200 from the starting point 1810 to the point 2300 past the object 1805, and along the new ray 2305 from the point 2300 past the object 1805 to the ending point 1815.

By determining a path using ray tracing, an AIS may reduce the number of calculations required to determine a path between a starting point and an ending point. For example, an a-star algorithm may require an AIS to draw a grid which divides the entire three-dimensional scene, calculate factors associated with each block in the grid, and determine a path based on the factors associated with each block in the grid. In contrast, by using ray-tracing to perform path finding, and AIS may use a spatial index, or combined spatial index, which may have been previously generated by an image processing system or physics engine with relatively few intersection tests. Therefore, the AIS may not have to create a grid which divides the three-dimensional scene specifically for path-finding purposes. Furthermore, by using the spatial index the AIS may not have to store an additional data structure (in addition to the spatial index) and, consequently, may save precious memory space (e.g., cache memory).

Figure 24:
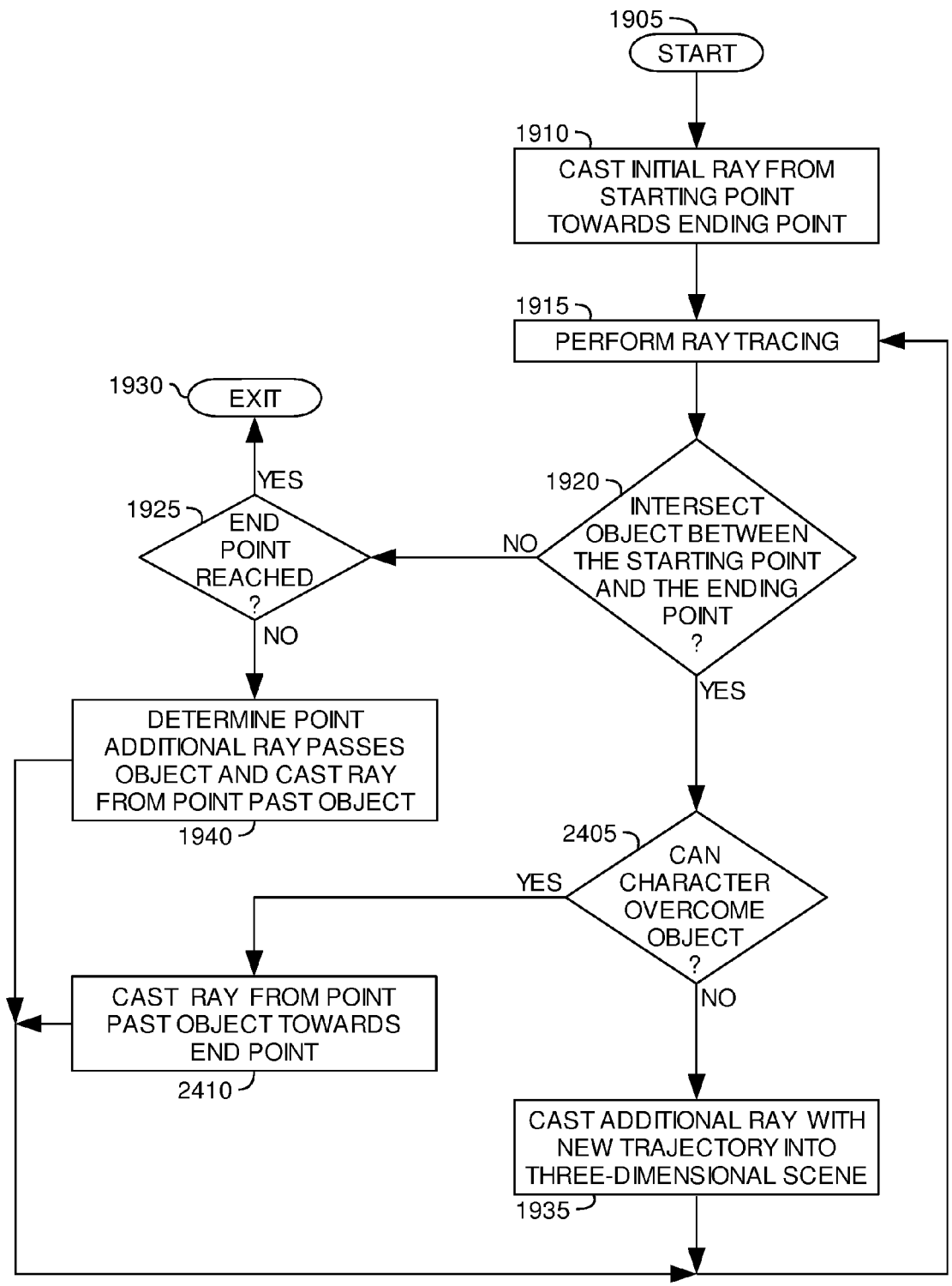

FIG. 24 illustrates a second exemplary method 2400 of using ray tracing to determine a path between a starting point and an ending point, according to an embodiment of the invention. The method is similar to the method 1900 described above with respect to FIG. 19. However, the method 2400 may determine a path between a starting point and an ending point in a three-dimensional scene which contains objects which may be overcome by a character.

Objects which may be overcome by a character may have properties which allow a character to go through, under, or over an object. Objects which may be overcome may include, but are not limited to, objects which are short and may be climbed over or ducked under by a character, objects which may be elevated and thus may be crawled under or ducked under by a character, or objects may be breakable and/or clearable such as glass or wood.

As mentioned above, method 2400 may be similar to method 1900 however, when it is determined that a ray intersects an object within the three-dimensional scene, instead of proceeding directly to step 1935 to cast an additional ray with a new trajectory into the three-dimensional scene in order to determine an alternate path, the AIS may proceed first to step 2405 to determine if the character can overcome the object.

The AIS may determine if the character can overcome the object by assessing capabilities or defining characteristics of the character (e.g., height, leaping ability, strength, crawling size, climbing ability, etc.), assessing the attributes of the object (e.g., elevation, height, weight, brittleness, frangibility, etc.), and comparing the capabilities of the character with the attributes of the object to determine if the character can overcome the object. For example, if a capability of a character is that the character can lift/move one-hundred pounds of weight, and the weight of an object within the path of the initial ray (i.e., intersected by the ray) is only fifty pounds, then the AIS may determine at step 2405 that the object may be overcome (lifted/moved) by the character. Consequently, the AIS may proceed to step 2410 to issue a new ray from a point past the object and with a trajectory directed towards the end point.

However, if the AIS determines at step 2405 that the character cannot overcome an object intersected by a ray (e.g., the initial ray issued by the AIS), the AIS may proceed to step 1935 to issue a new ray into the three-dimensional scene with a trajectory different than that of the previously issued ray (e.g., the initial ray) in an attempt to find an alternate path around the object.

Figure 25:
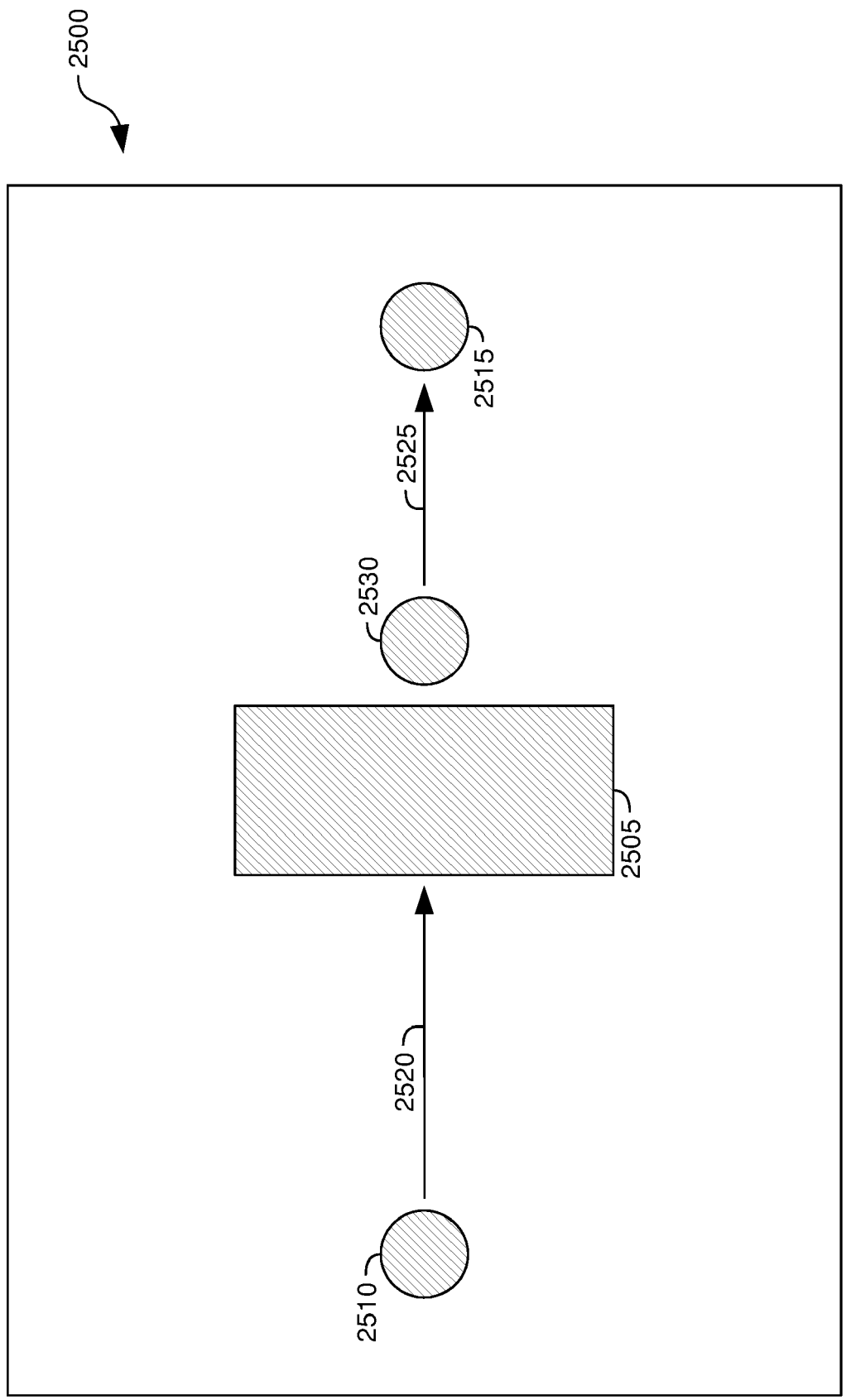

For example, FIG. 25 illustrates a three-dimensional scene 2500 containing a relatively short object 2505. The three-dimensional scene 2500 may also contain a starting point 2510 and an ending point 2515 which the AIS may be responsible for determining a path between the two points. Furthermore, as illustrated in FIG. 25 the AIS may issue an initial ray 2520 into the three-dimensional scene. The AIS may determine that the initial ray 2520 intersects the object 2505. At step 2405 of method 2400 the AIS may determine that the character has attributes which would allow the character to climb over the relatively short object 2505. Consequently, the AIS may proceed to step 2410 of method 2400 to issue a new ray into the three-dimensional scene, from a point past the object 2505. For example, the AIS may issue the new ray 2525 into the three-dimensional scene from a point 2530 past the object 2505. The trajectory of the new ray 2525 may be directed towards the ending point 2515.

The AIS may determine that the new ray 2525 proceeds uninterrupted to the ending point 2515 (i.e., the new ray 2525 does not intersect any objects). Consequently, the path between the starting point 2510 and the ending point 2515 for the character may be along the path of the initial ray, over the object 2505, and along the path of the new ray 2525 to the ending point 2515. Thus, the method 2400 may be used to determine a path for a character in a three-dimensional scene containing objects which may be overcome by the character.

Although methods 1900 and 2400 are described as the final path being along a the path of rays having a finite width and between a starting point and an ending point, embodiments of the invention are envisioned wherein the path must have a distinct size or shape in order to enable, for example, a character of a certain dimensions (e.g., width or height) to traverse the determined path. According to embodiments of the invention, a shape or path box may be generated or constructed around a character of specific dimensions which may traverse the path to be traversed by the character. For example, the AIS may construct a path box which bounds the character and surrounds the starting point and the ending point. Embodiments of the invention may determine if a possible path for the character (represented by the path box) can be traversed by the character, by box casting the path box through the three-dimensional scene. Box casting may be accomplished using a spatial index and in a similar manner as described above with respect to FIG. 14. By box casting the path box through the three-dimensional scene an AIS may determine if the path box intersects any objects within the three-dimensional scene. If the path box does not intersect any objects within the three-dimensional scene, then a path for the character may be through the path box from the starting point to the ending point.

However, if the AIS determines that the path box intersects an object or objects (impassable objects) within the three-dimensional scene, the AIS may generate a different path box or may generate a plurality of different path boxes where each path box may represent a possible alternate path to be taken by the character. The AIS may then perform box casting with the different path boxes until a path is found between the starting point and the ending point. The generation of different path boxes may be similar to how the AIS may try different trajectories of rays to determine a different path (as described above with regards to FIG. 19).

Thus, similar to how rays with various trajectories were used to determine a path between a starting point and an ending point in method 1900, box casting may also be used to determine a path between a starting point and an ending point for a character of certain dimensions.

CONCLUSION

Using ray-tracing, an artificial intelligence system may determine a path between a starting point and an ending point. According to embodiments of the invention, an artificial intelligence system may cast a ray into a three-dimensional scene to determine a path from a starting point to an ending point. The ray may have a trajectory which originates at the starting point and proceeds towards the ending point. The artificial intelligence system may perform ray-tracing using a spatial index to determine if the ray intersects any objects within the three-dimensional scene. If the ray reaches the ending point without intersecting any objects, the path of the ray from the starting point to the ending point is the path. However, if the ray intersects an object, the artificial intelligence system may cast additional rays into the three-dimensional scene and perform ray tracing with the additional rays to determine a path from the starting point to the ending point.

While the foregoing is directed to embodiments of the present invention, other and further embodiments of the invention may be devised without departing from the basic scope thereof, and the scope thereof is determined by the claims that follow.

What is claimed is:

1. A computer-implemented method of artificial intelligence path finding in a virtual environment, comprising:
  determining, using ray tracing and for a character in the virtual environment, a path from a starting point to an ending point of a three-dimensional scene of the virtual environment, comprising, by operation of one or more computer processors:
    issuing an initial ray into the three-dimensional scene of the virtual environment, wherein the initial ray originates at the starting point and has a trajectory directed towards the ending point;
    determining if the initial ray intersects an object between the starting point and the ending point in the three-dimensional scene of the virtual environment by performing ray tracing;
    upon determining that the initial ray does not intersect any objects within the three-dimensional scene of the virtual environment, setting the path from the starting point to the ending point for the character to include the trajectory of the initial ray; and
    upon determining that the initial ray intersects an object within the three-dimensional scene of the virtual environment, issuing additional rays into the three-dimensional scene until a predetermined condition is satisfied, wherein the predetermined condition is satisfied upon determining that a ray is issued which does not intersect the object, wherein each additional ray originates at the starting point and has a trajectory different from the trajectory of any previously issued ray, wherein the additional rays are issued in an alternating manner from at least two sides of the initial ray, wherein each side of the initial ray is a distinct half-plane defined by the initial ray, wherein each additional ray issued from each side is farther from the initial ray than any additional ray previously issued from the respective side of the initial ray, as measured by an angle between the respective additional ray and the initial ray.

2. The method of claim 1, wherein at least two of the at least two sides of the initial ray are opposite to one another, and wherein the path from the starting point to the ending point is determined without generating any pathfinding grid dividing the three-dimensional scene.

3. The method of claim 2, wherein determining if the initial ray intersects any objects in the three-dimensional scene by performing ray-tracing comprises:
traversing the initial ray through a spatial index which partitions the three-dimensional scene by taking branches to nodes corresponding to bounding volumes intersected by the ray.

4. The method of claim 3, wherein the spatial index is pre-existing spatial index that is generated for at least one of image processing and physics simulation, and wherein the spatial index comprises at least one of a k-dimensional tree (kd-tree), a binary space partitioning (BSP) tree, and an octree.

5. The method of claim 4, wherein the nodes of the special index define bounding volumes which partition the three-dimensional scene, and wherein at least one node of the kd-tree defines a single splitting plane for splitting a bounding volume in the three-dimensional scene.

6. The method of claim 5, wherein the at least one node of the kd-tree comprises an internal node containing: (i) information which indicates an axis along which the splitting plane is drawn; (ii) information which indicates a position of the splitting plane along the axis; and (iii) a pointer to a child node.

7. The method of claim 6, wherein the child node is selected from a second internal node and a leaf node, wherein the leaf node represents a bounding volume that is not further subdivided by any splitting plane defined by the kd-tree, wherein the leaf node comprises a pointer to at least one of the objects within the three-dimensional scene.

8. The method of claim 7, wherein the object obstructs movement of the character along the trajectory of the initial ray, and wherein the predetermined condition is also satisfied upon determining that the character is capable of performing a predefined action to overcome the object at a point at which the at least one additional ray intersects the object.

9. The method of claim 8, wherein issuing the additional rays into the three-dimensional scene further comprises:
once an additional ray is issued which does not intersect the object, determining a point past the object and issuing a new ray into the three-dimensional scene from the point past the object, wherein the new ray has a trajectory directed towards the ending point;
determining if the new ray intersects an object within the three-dimensional scene by performing ray tracing; and
upon determining that the new ray does not intersect an object within the three-dimensional scene, setting the path from the starting point to the ending point to include:
(i) a first segment from the starting point to the point past the object along a trajectory of the additional ray; and
(ii) a second segment from the point past the object to the ending point along a trajectory of the new ray.

10. The method of claim 9, wherein issuing the additional rays into the three-dimensional scene further comprises, upon determining that the initial ray intersects an object within the three-dimensional scene:
determining, from the property of the object and the capability of the character, whether the character is capable of performing a predefined action to overcome the object;
upon determining that the character is capable of performing the predefined action to overcome the object, issuing the additional ray into the three-dimensional scene, the additional ray having a starting point beyond the object and a trajectory directed towards the end point; and
upon determining that the character is not capable of performing any action necessary to overcome the object, issuing a new ray into the three-dimensional scene, the new ray having: (i) a starting point within the trajectory of the initial ray but prior to intersecting the object and (ii) a trajectory not directed towards the end point.

11. A non-transitory computer readable storage medium containing a program which, when executed, performs operations comprising:
determining, using ray tracing and for a character in a virtual environment, a path from a starting point to an ending point of a three-dimensional scene of the virtual environment, comprising, by operation of one or more computer processors when executing the program:
issuing an initial ray into a three-dimensional scene of a virtual environment, wherein the initial ray originates at the starting point and has a trajectory directed towards the ending point;
determining if the initial ray intersects an object between the starting point and the ending point in the three-dimensional scene of the virtual environment by performing ray tracing;
upon determining that the initial ray does not intersect any objects within the three-dimensional scene of the virtual environment, setting a path from the starting point to the ending point for the character to include the trajectory of the initial ray; and
upon determining that the initial ray intersects an object within the three-dimensional scene of the virtual environment, issuing additional rays into the three-dimensional scene until a predetermined condition is satisfied, wherein the predetermined condition is satisfied upon determining that a ray is issued which does not intersect the object, wherein each additional ray originates at the starting point and has a trajectory different from the trajectory of any previously issued ray, wherein the additional rays are issued in an alternating manner from at least two sides of the initial ray, wherein each side of the initial ray is a distinct half-plane defined by the initial ray, wherein each additional ray issued from each side is farther from the initial ray than any additional ray previously issued from the respective side of the initial ray, as measured by an angle between the respective additional ray and the initial ray.

12. The non-transitory computer readable storage medium of claim 11, wherein determining if the initial ray intersects any objects in the three-dimensional scene by performing ray-tracing comprises:
traversing the initial ray through a spatial index which partitions the three-dimensional scene by taking branches to nodes corresponding to bounding volumes intersected by the ray.

13. The non-transitory computer readable storage medium of claim 11, wherein issuing the additional rays into the three-dimensional scene comprises:
if the initial ray intersects an object within the three-dimensional scene, issuing additional rays into the three-dimensional scene until a ray is issued which does not intersect the object, wherein each additional ray originates at the starting point and has a trajectory different from the trajectory of any previously issued ray; and
once an additional ray is issued which does not intersect the object, determining a point past the object, and issuing a new ray into the three-dimensional scene from the point past the object, wherein the new ray has a trajectory directed towards the ending point.

14. The non-transitory computer readable storage medium of claim 13, wherein issuing the additional rays into the three-dimensional scene further comprises:
   determining if the new ray intersects an object within the three-dimensional scene by performing ray tracing; and
   if the new ray does not intersect an object within the three-dimensional scene, setting the path from the starting point to the ending point to include:
   (i) a first segment from the starting point to the point past the object along a trajectory of the additional ray; and
   (ii) a second segment from the point past the object to the ending point along a trajectory of the new ray.

15. The non-transitory computer readable storage medium of claim 11, wherein issuing the additional rays into the three-dimensional scene comprises:
   if the initial ray intersects an object within the three-dimensional scene, determining, from the property of the object and the capability of the character, whether the character is capable of performing a predefined action to overcome the object.

16. The non-transitory computer readable storage medium of claim 15, wherein the additional ray has a trajectory different from the trajectory of the initial ray, and wherein the additional ray is determined based on at least a capability of the character of performing one or more predefined actions necessary to overcome the object, wherein issuing the additional rays into the three-dimensional scene further comprises:
   upon determining that the character is capable of performing the predefined action to overcome the object, issuing the additional ray into the three-dimensional scene, the additional ray having a starting point beyond the object and a trajectory directed towards the end point.

17. An artificial intelligence system, comprising:
   a memory device containing a spatial index having nodes which correspond to bounding volumes which partition a three-dimensional scene of a virtual environment; and
   a processing element configured to determine, for a character in the virtual environment, a path from a starting point to an ending point of a three-dimensional scene of the virtual environment by:
   issuing an initial ray into a three-dimensional scene of the virtual environment, wherein the initial ray originates at the starting point and has a trajectory directed towards the ending point;
   determining if the initial ray intersects an object between the starting point and the ending point in the three-dimensional scene of the virtual environment by performing ray tracing;
   upon determining that the initial ray does not intersect any objects within the three-dimensional scene of the virtual environment, setting a path from the starting point to the ending point for the character to include the trajectory of the initial ray; and
   upon determining that the initial ray intersects an object within the three-dimensional scene of the virtual environment, issuing additional rays into the three-dimensional scene until a predetermined condition is satisfied, wherein the predetermined condition is satisfied upon determining that a ray is issued which does not intersect the object, wherein each additional ray originates at the starting point and has a trajectory different from the trajectory of any previously issued ray, wherein the additional rays are issued in an alternating manner from at least two sides of the initial ray, wherein each side of the initial ray is a distinct half-plane defined by the initial ray, wherein each additional ray issued from each side is farther from the initial ray than any additional ray previously issued from the respective side of the initial ray, as measured by an angle between the respective additional ray and the initial ray.

18. The artificial intelligence system of claim 17, wherein the processing element performs ray-tracing by:
   traversing the initial ray through a spatial index which partitions the three-dimensional scene by taking branches to nodes corresponding to bounding volumes intersected by the ray.

19. The artificial intelligence system of claim 17, wherein issuing the additional rays into the three-dimensional scene comprises:
   issuing additional rays into the three-dimensional scene until a ray is issued which does not intersect the object, wherein each additional ray originates at the starting point and has a trajectory different from the trajectory of any previously issued ray; and
   upon determining that an additional ray is issued which does not intersect the object, determining a point past the object and issuing a new ray into the three-dimensional scene from the point past the object, wherein the new ray has a trajectory directed towards the ending point.

20. The artificial intelligence system of claim 19, wherein issuing the additional rays into the three-dimensional scene further comprises:
   determine if the new ray intersects an object within the three-dimensional scene by performing ray tracing; and
   if the new ray does not intersect an object within the three-dimensional scene, set the path from the starting point to the ending point to include:
   (i) a first segment from the starting point to the point past the object along a trajectory of the additional ray; and
   (ii) a second segment from the point past the object to the ending point along a trajectory of the new ray.

21. The artificial intelligence system of claim 17, wherein the object obstructs movement of the character along the trajectory of the initial ray, wherein the additional ray has a trajectory different from the trajectory of the initial ray, and wherein the additional ray is determined based on at least a capability of the character of performing one or more predefined actions necessary to overcome the object, wherein issuing at least one additional ray into the three-dimensional scene comprises:
   determining, from the property of the object and the capability of the character, whether the character is capable of performing a predefined action to overcome the object, and
   if so, issuing an additional ray into the three-dimensional scene, the additional ray having a starting point beyond the object and a trajectory directed towards the end point.

22. A computer-implemented method of artificial intelligence path finding in a virtual environment, comprising:
   generating a initial path box within a three-dimensional scene of the virtual environment, wherein the initial path box encompasses at least a portion of a character and a path to be traversed by the character within the three-dimensional scene of the virtual environment;
   tracing the initial path box through a spatial index having nodes defining bounding volumes which partition the three-dimensional scene to determine if the initial path box intersects objects within the three-dimensional scene of the virtual environment; and
   based on the results of tracing the initial path box through the spatial index, determining a path for the character to traverse from a starting point to an ending point within the three-dimensional scene of the virtual environment, comprising, by operation of one or more computer processors:

upon determining that the initial path box intersects an object within the three-dimensional scene of the virtual environment, tracing additional path boxes into the three-dimensional scene until a predetermined condition is satisfied, wherein the predetermined condition is satisfied upon determining that a path box is issued which does not intersect the object, wherein each additional path box originates at the starting point and has a trajectory different from the trajectory of any previously issued path box, wherein the additional path boxes are issued in an alternating manner from at least two sides of the initial path box, wherein each additional path box issued from each side is farther from the initial path box than any additional path box previously issued from the respective side of the initial path box, as measured by an angle between the respective additional path box and the initial path box.

* * * * *